(12) United States Patent
Snow et al.

(10) Patent No.: US 11,328,290 B2
(45) Date of Patent: May 10, 2022

(54) STABLE CRYPTOCURRENCY COINAGE

(71) Applicant: Factom, Inc., Austin, TX (US)

(72) Inventors: Paul Snow, Austin, TX (US); Brian Deery, Austin, TX (US); Gavin Gillas, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 197 days.

(21) Appl. No.: 16/191,574

(22) Filed: Nov. 15, 2018

(65) Prior Publication Data
US 2020/0042988 A1 Feb. 6, 2020

Related U.S. Application Data

(60) Provisional application No. 62/723,595, filed on Aug. 28, 2018, provisional application No. 62/714,909,
(Continued)

(51) Int. Cl.
*G06Q 20/36* (2012.01)
*G06Q 20/06* (2012.01)

(52) U.S. Cl.
CPC ..... *G06Q 20/3672* (2013.01); *G06Q 20/0655* (2013.01); *G06Q 20/3678* (2013.01)

(58) Field of Classification Search
CPC ........... G06Q 20/3672; G06Q 20/3678; G06Q 20/0655; G06Q 2220/00; G06Q 40/04; G06Q 30/0208; G06Q 20/381
See application file for complete search history.

(56) References Cited

U.S. PATENT DOCUMENTS

| 4,309,569 A | 6/1982 | Merkel |
| 5,499,294 A | 3/1996 | Friedman |

(Continued)

FOREIGN PATENT DOCUMENTS

| CN | 110392052 | 10/2019 |
| DE | 10128728 | 1/2003 |

(Continued)

OTHER PUBLICATIONS

Watanabe, Hiroki, et al. "Blockchain contract: Securing a blockchain applied to smart contracts." *2016 IEEE International Conference on Consumer Electronics (ICCE)*. IEEE, 2016.
(Continued)

*Primary Examiner* — Neha Patel
*Assistant Examiner* — Chunling Ding
(74) *Attorney, Agent, or Firm* — Scott P. Zimmerman, PLLC

(57) ABSTRACT

A two-coin mechanism for maintaining a stable value of cryptographic coinage traded in a decentralized market exchange without requiring a reserve. A pegged cryptographic token and a variable-priced cryptographic token are both traded in the reserveless decentralized market exchange. The pegged cryptographic token and the variable-priced cryptographic token are value related based on a cryptographic exchange rate. Whenever a market transaction is processed (such as a buy or sell order), at least one of a destruction operation and a creation operation are performed. The destruction operation destroys at least one of the pegged cryptographic token and/or the variable-priced cryptographic token, while the creation operation creates new ones of the pegged cryptographic token and/or the variable-priced cryptographic token. The two-coin mechanism thus implements a decentralized and algorithmic monetary policy that removes and/or deposits cryptographic
(Continued)

tokens to/from the reserveless decentralized market exchange to alter supply and to maintain stable coinage values.

11 Claims, 30 Drawing Sheets

Related U.S. Application Data filed on Aug. 6, 2018, provisional application No. 62/714,911, filed on Aug. 6, 2018.

(56) References Cited

U.S. PATENT DOCUMENTS

| | | | |
|---|---|---|---|
| 5,862,218 A | 1/1999 | Steinberg | |
| 5,920,629 A | 7/1999 | Rosen | |
| 5,966,446 A | 10/1999 | Davis | |
| 6,363,481 B1 | 3/2002 | Hardjono | |
| 7,028,263 B2 | 4/2006 | Maguire | |
| 7,212,808 B2 | 5/2007 | Engstrom | |
| 7,272,179 B2 | 9/2007 | Siemens et al. | |
| 7,572,179 B2 | 8/2009 | Choi et al. | |
| 7,729,950 B2 | 6/2010 | Mendizabal et al. | |
| 8,245,038 B2 | 8/2012 | Golle et al. | |
| 8,266,439 B2 | 9/2012 | Haber et al. | |
| 8,442,903 B2 | 5/2013 | Zadoorian et al. | |
| 8,560,722 B2 | 10/2013 | Gates et al. | |
| 8,706,616 B1 | 4/2014 | Flynn | |
| 8,712,887 B2 | 4/2014 | DeGroeve et al. | |
| 8,867,741 B2 | 10/2014 | McCorkindale et al. | |
| 8,943,332 B2 | 1/2015 | Horne et al. | |
| 9,124,423 B2 | 9/2015 | Jennas, II et al. | |
| 9,378,343 B1 | 6/2016 | David | |
| 9,396,006 B2 | 7/2016 | Kundu et al. | |
| 9,398,018 B2 | 7/2016 | MacGregor | |
| 9,407,431 B2 | 8/2016 | Bellare et al. | |
| 9,411,524 B2 | 8/2016 | O'Hare et al. | |
| 9,411,976 B2 | 8/2016 | Irvine | |
| 9,411,982 B1 | 8/2016 | Dippenaar et al. | |
| 9,424,576 B2 | 8/2016 | Vandervort | |
| 9,436,935 B2 | 9/2016 | Hudon | |
| 9,472,069 B2 | 10/2016 | Roskowski | |
| 9,489,827 B2 | 11/2016 | Quinn et al. | |
| 9,584,493 B1 | 2/2017 | Leavy | |
| 9,588,790 B1 | 3/2017 | Wagner | |
| 9,722,790 B2 | 8/2017 | Ebrahimi | |
| 9,818,109 B2 | 11/2017 | Loh | |
| 9,830,580 B2 | 11/2017 | MacGregor | |
| 9,875,510 B1 | 1/2018 | Kasper | |
| 9,876,646 B2 | 1/2018 | Ebrahimi | |
| 9,882,918 B1 | 1/2018 | Ford et al. | |
| 10,102,265 B1 | 10/2018 | Madisetti | |
| 10,102,526 B1 | 10/2018 | Madisetti | |
| 10,108,954 B2 | 10/2018 | Dunlevy | |
| 10,135,607 B1 | 11/2018 | Roets | |
| 10,163,080 B2 | 12/2018 | Chow | |
| 10,346,815 B2 | 7/2019 | Glover | |
| 10,373,129 B1 * | 8/2019 | James | H04L 9/3247 |
| 10,586,270 B2 * | 3/2020 | Reddy | G06Q 20/12 |
| 10,628,268 B1 | 4/2020 | Baruch | |
| 10,826,685 B1 | 11/2020 | Campagna | |
| 10,929,842 B1 * | 2/2021 | Arvanaghi | H04L 67/10 |
| 10,958,418 B2 | 3/2021 | Ajoy | |
| 2003/0018563 A1 | 1/2003 | Kilgour et al. | |
| 2004/0085445 A1 | 5/2004 | Park | |
| 2005/0206741 A1 | 9/2005 | Raber | |
| 2006/0075228 A1 | 4/2006 | Black et al. | |
| 2006/0184443 A1 | 8/2006 | Erez et al. | |
| 2007/0027787 A1 | 2/2007 | Tripp | |
| 2007/0094272 A1 | 4/2007 | Yeh | |
| 2007/0174630 A1 | 7/2007 | Shannon | |
| 2007/0296817 A1 | 12/2007 | Ebrahimi et al. | |
| 2008/0010466 A1 | 1/2008 | Hopper | |
| 2008/0028439 A1 | 1/2008 | Shevade | |
| 2008/0059726 A1 | 3/2008 | Rozas | |
| 2009/0025063 A1 | 1/2009 | Thomas | |
| 2009/0287597 A1 | 11/2009 | Bahar | |
| 2010/0049966 A1 | 2/2010 | Kato | |
| 2010/0058476 A1 | 3/2010 | Isoda | |
| 2010/0161459 A1 | 6/2010 | Kass et al. | |
| 2010/0228798 A1 | 9/2010 | Kodama | |
| 2010/0241537 A1 | 9/2010 | Kass et al. | |
| 2011/0061092 A1 | 3/2011 | Bailloeul | |
| 2011/0161674 A1 | 6/2011 | Ming | |
| 2012/0203670 A1 | 8/2012 | Piersol | |
| 2012/0264520 A1 * | 10/2012 | Marsland | A63F 13/533 463/42 |
| 2013/0142323 A1 | 6/2013 | Chiarella | |
| 2013/0222587 A1 | 8/2013 | Roskowski | |
| 2013/0276058 A1 | 10/2013 | Buldas | |
| 2014/0201541 A1 | 7/2014 | Paul | |
| 2014/0229738 A1 | 8/2014 | Sato | |
| 2014/0282852 A1 | 9/2014 | Vestevich | |
| 2014/0289802 A1 | 9/2014 | Lee | |
| 2014/0344015 A1 | 11/2014 | Puertolas-Montasnes et al. | |
| 2015/0193633 A1 | 7/2015 | Chida | |
| 2015/0206106 A1 | 7/2015 | Yago | |
| 2015/0242835 A1 | 8/2015 | Vaughan | |
| 2015/0244729 A1 | 8/2015 | Mao | |
| 2015/0309831 A1 | 10/2015 | Powers | |
| 2015/0332256 A1 | 11/2015 | Minor | |
| 2015/0378627 A1 | 12/2015 | Kitazawa | |
| 2015/0379484 A1 | 12/2015 | McCarthy | |
| 2016/0071096 A1 | 3/2016 | Rosca | |
| 2016/0098578 A1 | 4/2016 | Hincker | |
| 2016/0119134 A1 | 4/2016 | Hakoda et al. | |
| 2016/0148198 A1 | 5/2016 | Kelley | |
| 2016/0162897 A1 | 6/2016 | Feeney | |
| 2016/0217436 A1 | 7/2016 | Brama | |
| 2016/0239653 A1 | 8/2016 | Loughlin-Mchugh | |
| 2016/0253663 A1 | 9/2016 | Clark et al. | |
| 2016/0260091 A1 | 9/2016 | Tobias | |
| 2016/0267472 A1 | 9/2016 | Lingham et al. | |
| 2016/0267558 A1 | 9/2016 | Bonnell et al. | |
| 2016/0275294 A1 | 9/2016 | Irvine | |
| 2016/0283920 A1 | 9/2016 | Fisher et al. | |
| 2016/0292396 A1 | 10/2016 | Akerwall | |
| 2016/0292672 A1 | 10/2016 | Fay et al. | |
| 2016/0292680 A1 | 10/2016 | Wilson, Jr. et al. | |
| 2016/0294783 A1 | 10/2016 | Piqueras Jover | |
| 2016/0300200 A1 | 10/2016 | Brown et al. | |
| 2016/0300234 A1 | 10/2016 | Moss-Pultz et al. | |
| 2016/0321675 A1 | 11/2016 | McCoy et al. | |
| 2016/0321751 A1 | 11/2016 | Creighton, IV et al. | |
| 2016/0321769 A1 | 11/2016 | McCoy | |
| 2016/0328791 A1 | 11/2016 | Parsells et al. | |
| 2016/0330031 A1 | 11/2016 | Drego et al. | |
| 2016/0330244 A1 | 11/2016 | Denton | |
| 2016/0337119 A1 | 11/2016 | Hosaka et al. | |
| 2016/0342977 A1 | 11/2016 | Lam | |
| 2016/0342989 A1 | 11/2016 | Davis | |
| 2016/0344737 A1 | 11/2016 | Anton et al. | |
| 2016/0371771 A1 | 12/2016 | Serrano | |
| 2017/0005797 A1 | 1/2017 | Lane et al. | |
| 2017/0005804 A1 | 1/2017 | Zinder | |
| 2017/0033933 A1 | 2/2017 | Haber | |
| 2017/0053249 A1 | 2/2017 | Tunnell et al. | |
| 2017/0061396 A1 | 3/2017 | Melika et al. | |
| 2017/0075938 A1 | 3/2017 | Black | |
| 2017/0103167 A1 | 4/2017 | Shah | |
| 2017/0124534 A1 | 5/2017 | Savolainen | |
| 2017/0124535 A1 | 5/2017 | Juels et al. | |
| 2017/0161439 A1 | 6/2017 | Raduchel | |
| 2017/0177898 A1 | 6/2017 | Dillenberger | |
| 2017/0178237 A1 | 6/2017 | Wong | |
| 2017/0213287 A1 | 7/2017 | Bruno | |
| 2017/0221052 A1 | 8/2017 | Sheng | |
| 2017/0228731 A1 | 8/2017 | Sheng | |
| 2017/0236123 A1 | 8/2017 | Ali | |
| 2017/0243208 A1 | 8/2017 | Kurian et al. | |
| 2017/0243289 A1 * | 8/2017 | Rufo | G06Q 40/04 |
| 2017/0244757 A1 | 8/2017 | Castinado et al. | |
| 2017/0330279 A1 * | 11/2017 | Ponzone | G06Q 20/0658 |

(56) References Cited

U.S. PATENT DOCUMENTS

| | | |
|---|---|---|
| 2017/0344983 A1 | 11/2017 | Mufti |
| 2017/0352031 A1 | 12/2017 | Collin |
| 2017/0353309 A1 | 12/2017 | Gray |
| 2017/0364642 A1* | 12/2017 | Bogdanowicz ........ G16H 50/30 |
| 2017/0373859 A1 | 12/2017 | Shors et al. |
| 2018/0005186 A1 | 1/2018 | Hunn |
| 2018/0075239 A1 | 3/2018 | Boutnaru |
| 2018/0075527 A1 | 3/2018 | Nagla et al. |
| 2018/0091524 A1 | 3/2018 | Setty |
| 2018/0097779 A1 | 4/2018 | Karame et al. |
| 2018/0101701 A1 | 4/2018 | Barinov |
| 2018/0101842 A1 | 4/2018 | Ventura |
| 2018/0108024 A1 | 4/2018 | Greco |
| 2018/0139042 A1 | 5/2018 | Binning |
| 2018/0157700 A1 | 6/2018 | Roberts |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vinay |
| 2018/0189333 A1 | 7/2018 | Childress |
| 2018/0189781 A1 | 7/2018 | McCann |
| 2018/0204213 A1 | 7/2018 | Zappier |
| 2018/0219683 A1 | 8/2018 | Deery |
| 2018/0219685 A1 | 8/2018 | Deery |
| 2018/0225640 A1 | 8/2018 | Chapman |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0036887 A1 | 1/2019 | Miller |
| 2019/0043048 A1 | 2/2019 | Wright |
| 2019/0044727 A1 | 2/2019 | Scott |
| 2019/0050855 A1 | 2/2019 | Martino |
| 2019/0073666 A1 | 3/2019 | Ortiz |
| 2019/0080284 A1 | 3/2019 | Kim |
| 2019/0081793 A1 | 3/2019 | Martino |
| 2019/0087446 A1 | 3/2019 | Sharma |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0236286 A1 | 8/2019 | Scriber |
| 2019/0251557 A1 | 8/2019 | Jin |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1 | 9/2019 | Palazzolo |
| 2019/0287107 A1 | 9/2019 | Gaur |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |
| 2019/0311357 A1* | 10/2019 | Madisetti ........... G06Q 20/3829 |
| 2019/0324867 A1 | 10/2019 | Tang |
| 2019/0334715 A1 | 10/2019 | Gray |
| 2019/0342422 A1 | 11/2019 | Li |
| 2019/0347444 A1 | 11/2019 | Lowagie |
| 2019/0347628 A1* | 11/2019 | Al-Naji .............. G06Q 20/3678 |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0372770 A1 | 12/2019 | Xu |
| 2019/0378128 A1 | 12/2019 | Moore |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004946 A1 | 1/2020 | Gilpin |
| 2020/0005290 A1 | 1/2020 | Madisetti |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0089690 A1 | 3/2020 | Qiu |
| 2020/0099534 A1 | 3/2020 | Lowagie |
| 2020/0104712 A1 | 4/2020 | Katz |
| 2020/0145219 A1 | 5/2020 | Sebastian |
| 2020/0167870 A1 | 5/2020 | Isaacson |
| 2020/0175506 A1 | 6/2020 | Snow |
| 2020/0195441 A1 | 6/2020 | Suen |
| 2020/0211011 A1 | 7/2020 | Anderson |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0302433 A1 | 9/2020 | Green |
| 2020/0389294 A1 | 12/2020 | Soundararajan |
| 2021/0174353 A1 | 6/2021 | Snow |
| 2021/0266174 A1 | 8/2021 | Snow |
| 2021/0272103 A1 | 9/2021 | Snow |
| 2021/0273810 A1 | 9/2021 | Lynde |
| 2021/0273816 A1 | 9/2021 | Deery et al. |

FOREIGN PATENT DOCUMENTS

| | | |
|---|---|---|
| EP | 3726438 | 10/2020 |
| JP | 5383297 | 1/2014 |
| KR | 100653512 | 12/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |
| WO | WO-2018127923 A1 * | 7/2018 ........... G06Q 20/381 |
| WO | WO 2019/207504 | 10/2021 |

OTHER PUBLICATIONS

Crosby, Michael et al., "BlockChain Technology, Beyond Bitcoin", Sutardja Center for Entrepreneurship & Technology, Berkeley Engineering, Oct. 16, 2015, 35 pages.

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

Unknown, "Midex", https://promo.midex.com/Midex_EN.pdf, 25 pages.

(56) References Cited

OTHER PUBLICATIONS

Unknown, Xtrade White Paper, https://xtrade1-9649.kxcdn.com/wp-content/uploads/2017/09/xtrade-whitepaper.pdf Feb. 7, 2018, 37 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Chakravorty, Antorweep, and Chunming Rong, "Ushare: user controlled social media based on blockchain." *Proceedings of the 11th International Conference on Ubiquitous Information Management and Communication*. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on, IEEE, 2017.

Al-Naji, Nader et al., "Basis: A Price-Stable Cryptocurrency with an Algorithmic Central Bank" www.basis.io Jun. 20, 2017, 27 pages.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Written Opinion in PCT/US2021/040207, Snow, dated Oct. 7, 2021.

Menezes, Alfred. J., et al. "Handbook of Applied Cryptography," 1997, CRC Press, p. 527-28.

White, Ron, "How Computers Work," Oct. 2003, Que, Seventh Edition (Year: 2003), 23 pages.

Luu et al., Making Smart Contracts Smarter, 2016.

Feng and Luo, "Evaluating Memory-Hard Proof-of-Work Algorithms on Three Processors," PVLDB, 13(6): 898-911, 2020.

Luther, "Do We Need A "Fedcoin" Cryptocurrency?," ValueWalk, Newstex Global Business Blogs, Dec. 30, 2015 (Year: 2015).

Iddo Bentov, Bitcoin and Secure Computation with Money, May 2016 (Year: 2016).

United States: New Generation cryptocurrency, USDX Protocol, Offers Crypto Advantages and Fiat Pegging, Apr. 2, 2018 (Year: 2018).

Ana Reyna et al.; "On blockchain and its integration with IoT. Challenges and opportunities." Future Generation Computer Systems. vol. 88, Nov. 2018, pp. 173-190. https://www.sciencedirect.com/science/article/pii/S0167739X17329205 (Year: 2018).

Krol, Michal et al., "SPOC: Secure Payments for Outsourced Computations" https://arxiv.org/pdf/1807.06462.pdf. (Year: 2018).

Dai et al., "TrialChain: A Blockchain-Based Platform to Validate Data Integrity in Large, Biomedical Research Studies," arXiv:1807.03662, Jul. 10, 2018 (Year: 2018).

* cited by examiner

STABLE CRYPTOCURRENCY COINAGE

CROSS-REFERENCE TO RELATED APPLICATIONS

This application claims domestic benefit of U.S. Provisional Application No. 62/723,595 filed Aug. 28, 2018 and incorporated herein by reference in its entirety. This application also claims domestic benefit of U.S. Provisional Application No. 62/714,909 filed Aug. 6, 2018 and incorporated herein by reference in its entirety. This application also claims domestic benefit of U.S. Provisional Application No. 62/714,911 filed Aug. 6, 2018 and incorporated herein by reference in its entirety.

BACKGROUND

Cryptographic coinage and blockchains are growing in usage. As usage grows, however, volatility has become a problem. The markets for cryptographic coinage have become highly speculative and extreme price variations are hindering mainstream adoption.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

Figure 1:
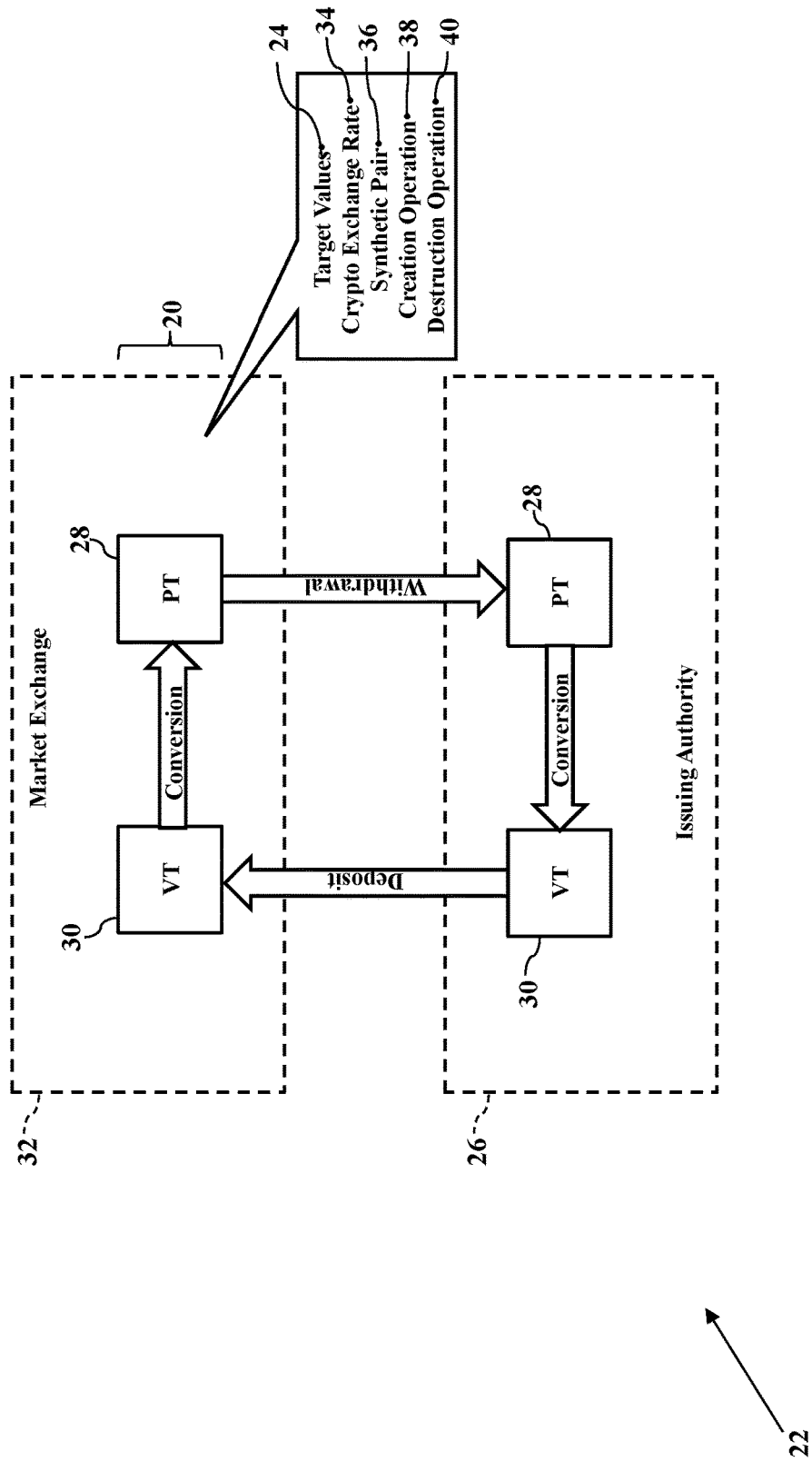
FIGS. 1-7 are simplified illustrations of stability mechanisms for cryptographic coinage in a blockchain environment.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIGS. 1-7 are simplified illustrations of stability mechanisms for cryptographic coinage 20 in a blockchain environment 22, according to exemplary embodiments. Here exemplary embodiments may create, and/or destroy, the cryptographic coinage 20 to maintain a stable price or value as to a target value 24. For example, an issuing authority 26 creates or issues pegged cryptographic tokens (or "PT") 28 and variable-priced cryptographic tokens (or "VT") 30. Each pegged cryptographic token 28 and each variable-priced cryptographic token 30 is preferably freely and independently traded in a market exchange 32, but the market exchange 32 is not necessary. Regardless, a cryptographic exchange rate 34 defines or establishes relative values between the pegged cryptographic token 28 and the variable-priced cryptographic token 30. That is, the cryptographic exchange rate 34 allows the value of the pegged cryptographic token 28 to be determined, converted, and/or exchanged into the variable-priced cryptographic token 30 and vice versa.

The issuing authority 26 may perform synthetic pairing. Because the values of the pegged cryptographic token 28 and the variable-priced cryptographic token 30 are related (perhaps via the cryptographic exchange rate 34), the pegged cryptographic token 28 and the variable-priced cryptographic token 30 may be termed a synthetic pair 36 and their supply may be managed using a creation operation 38 and/or a destruction operation 40. For example, any user or holder of the variable-priced cryptographic token(s) 30 may request that the issuing authority 26 covert a certain number of her variable-priced cryptographic tokens 30 to the pegged cryptographic token(s) 28, perhaps on demand, at the current cryptographic exchange rate 34. Here, though, exemplary embodiments may perform the destruction operation 40 to destroy the user's requested number of her variable-priced cryptographic token(s) 30 and also perform the creation operation 38 to create an equivalent number of the pegged cryptographic tokens 28, as determined by the current cryptographic exchange rate 34. In plain words, exemplary embodiments destroy the user's requested number of her variable-priced cryptographic tokens 30 and create the equivalent number of the pegged cryptographic tokens 28.

Figure 2:
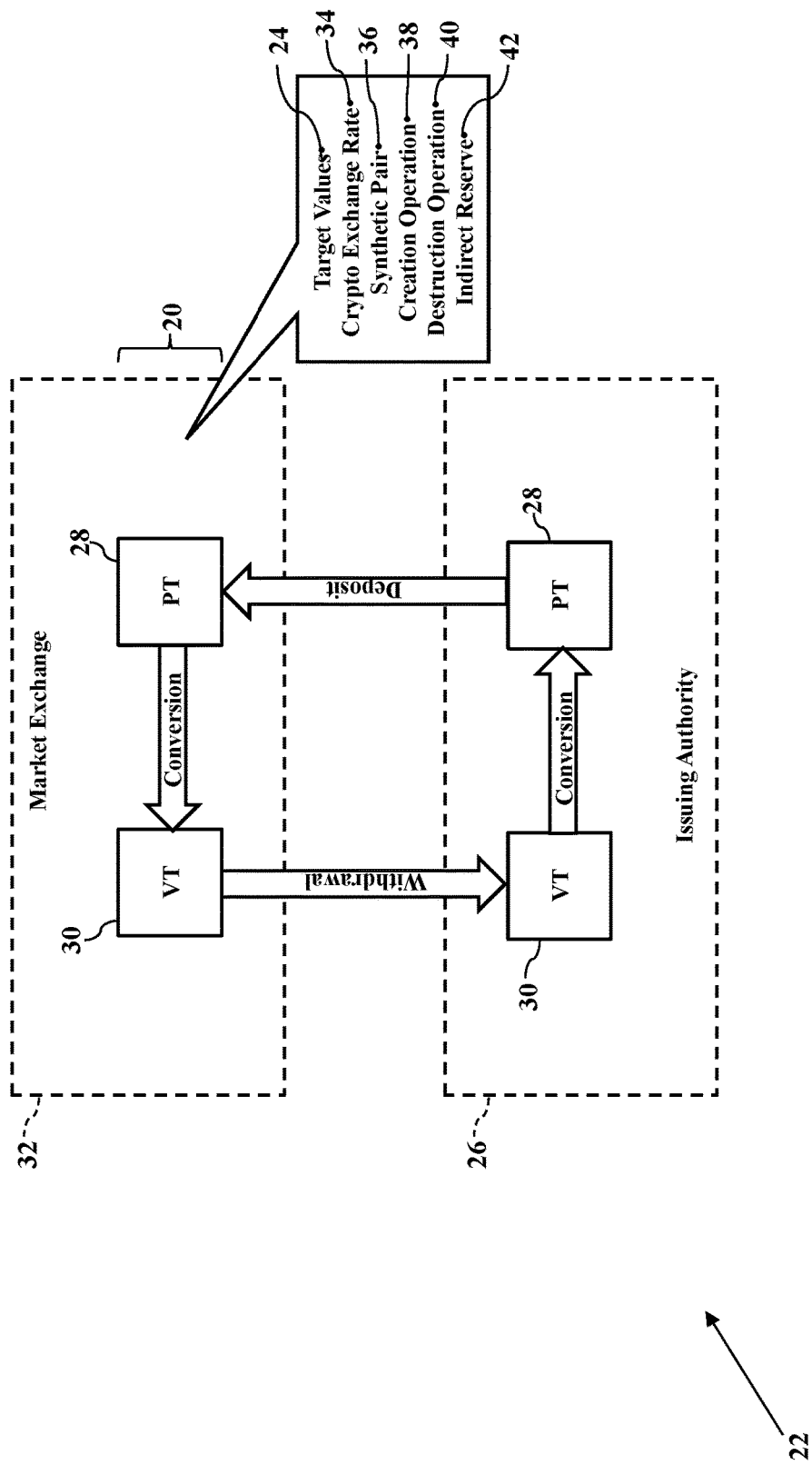

FIG. 2 illustrates additional synthetic pairing. Here the user or holder may request that the issuing authority 26 covert a certain number of her pegged cryptographic tokens 28 to the equivalent number of the variable-priced cryptographic tokens 30, perhaps on demand, again at the current cryptographic exchange rate 34. The issuing authority 26 may thus perform the destruction operation 40 to destroy the user's requested number of her pegged cryptographic tokens 28 and also perform the creation operation 38 to create the equivalent number of the variable-priced cryptographic tokens, as determined by the current cryptographic exchange rate 34.

Exemplary embodiments thus eliminate reserves. Conventional stablecoin mechanisms are backed by fiat reserves or traditional assets. Exemplary embodiments, in contradistinction, eliminate any reserve requirement by leveraging the ability to create, issue, and destroy the pegged cryptographic tokens 28 and the variable-priced cryptographic tokens 30, according to the cryptographic exchange rate 34 as determined by the free market exchange 32. Simply put, the issuing authority 26 financially or reputationally backs the pegged cryptographic tokens 28 using the variable-priced cryptographic tokens as an indirect reserve 42.

Exemplary embodiments thus present a simple and elegant solution for stable values of the cryptographic coinage 20. The indirect reserve 42 has the advantage of seigniorage shares, without the complexity. That is, exemplary embodiments elastically manage the supply of the pegged cryptographic tokens 28 and the variable-priced cryptographic tokens 30 in a decentralized fashion, without large and cumbersome collateral requirements and complex algorithmic regulations. Seigniorage shares act like a central bank to issue stable tokens, but seigniorage shares assumes that the basis of the issuance is a token outside the control of a smart contract. Here, the indirect reserve 42 assumes the issuing authority 26 has control of both the pegged cryptographic token 28 and the variable-priced cryptographic token 30. By playing off the volatility of the variable-priced cryptographic token 30 against the pegged cryptographic token 28, the indirect reserve 42 is able to leverage game theory and arbitrage to get the free market exchange 32 to force the pegged cryptographic token 28 to match its target value 24.

Exemplary embodiments satisfy the goals for a stablecoin mechanism. The pegged cryptographic token 28 should be secure against crashes, decentralized, and collaterally efficient. The indirect reserve 42 is always able to meet its obligations, because the issuing authority 26, by definition, has the management power and authority to create and to destroy the supply of the variable-priced cryptographic tokens 30 and the pegged cryptographic tokens 28. There are no reserves to run out, and the issuing authority 26 may also match any obligation. The mechanisms for conversion between the variable-priced cryptographic tokens 30 and the pegged cryptographic tokens 28 are completely distributed and autonomous, thus satisfying the goal of decentralization. Moreover, the pegged cryptographic tokens 28 are created as collateral in the variable-priced cryptographic tokens 30 and destroyed in one direction, while the variable-priced cryptographic tokens 30 are created as collateral in the pegged cryptographic tokens 28 and destroyed in the other direction, so no collateral is actually held or required by the issuing authority 26. Simply put, the issuing authority 26 never runs out of, or exhausts, or overleverages, its collateral, so the issuing authority 26 may always respond to and execute buy/sell/trade orders from clients. Exemplary embodiments eliminate any need for auctioned bonds.

Figure 3:
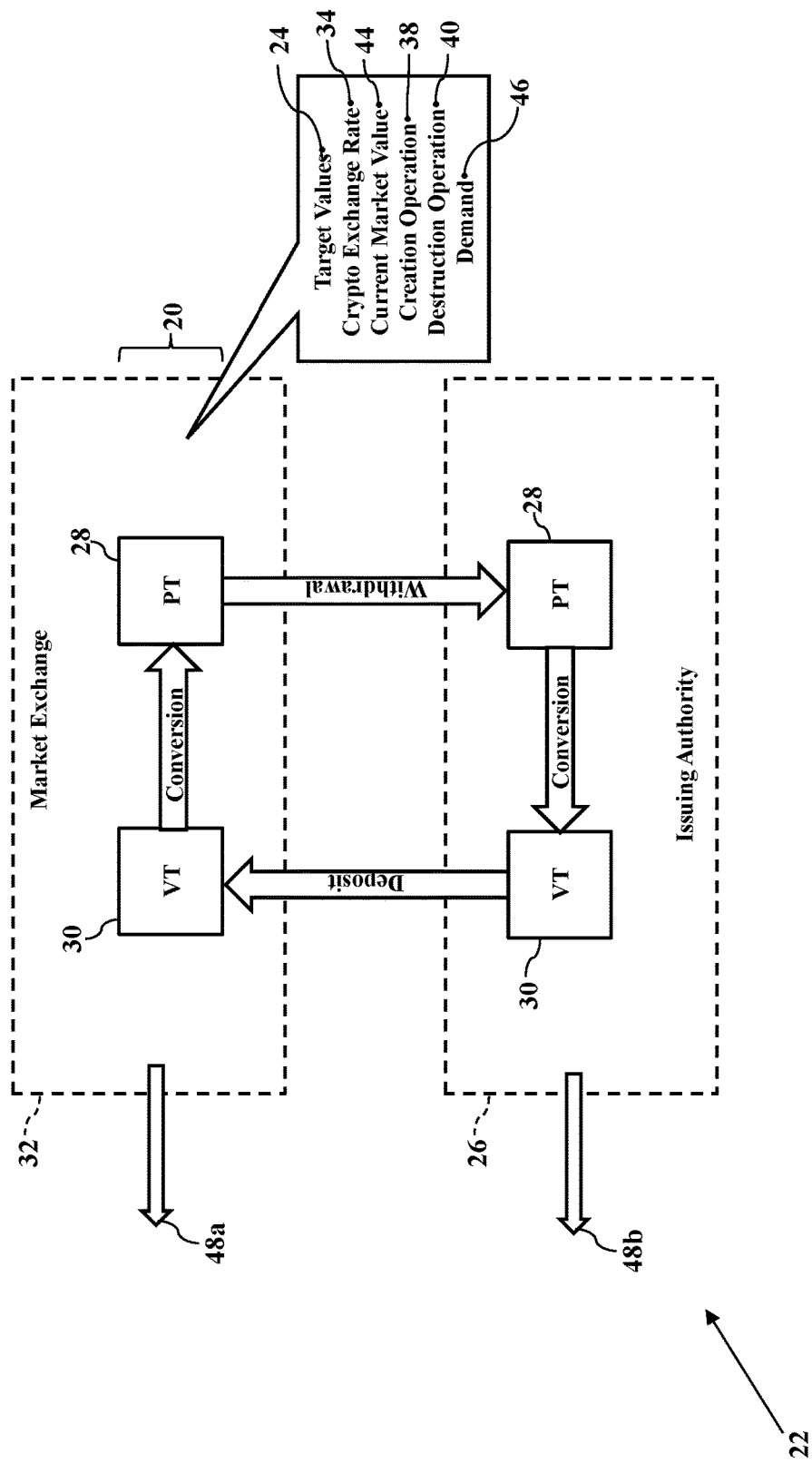

FIG. 3 illustrates a below-target scenario. Here a current market value 44 of the pegged cryptographic token 28 lags, or trails, the desired target value 24. Put another way, if the pegged cryptographic token 28 is trading low, then a demand 46 for the pegged cryptographic token 28 is low and devalued relative to the variable-priced cryptographic token 30. Traders see a buy opportunity in the pegged cryptographic token 28, while holders of the variable-priced cryptographic token 30 see a sell opportunity to reap a profit. The holders of the variable-priced cryptographic tokens 30 will sell or exchange a quantity of their variable-priced cryptographic tokens 30 for an equivalent number of the pegged cryptographic tokens 28 (according to the cryptographic exchange rate 34), thus realizing the profit. The issuing authority 26, acting in concert with the free market exchange 32, jointly operate as a powerful stabilizing force for the pegged cryptographic token 28. Exemplary embodiments may thus enforce independent trading platforms like exchanges through arbitrage to create a Schelling point at the target value 24 of the pegged cryptographic token 28.

Stabilization may occur. Because a profit opportunity exists, holders sell or exchange their variable-priced cryptographic tokens 30 for an equivalent number of the pegged cryptographic tokens 28 (according to the cryptographic exchange rate 34), thus realizing the profit. As the sales/exchanges are processed, the population pool or quantity of the variable-priced cryptographic tokens 30 in the market exchange 32 is reduced (perhaps due to the destruction operation 40) and the population quantity or pool of the pegged cryptographic tokens 28 (e.g., a total number in usage or issuance) increases in the market exchange 32 (perhaps due to the creation operation 38). As the crypto-coinage exchange proceeds, the issuing authority 26 and/or the market exchange 32 may monitor the population supplies of the variable-priced cryptographic tokens 30, the pegged cryptographic tokens 28, their current market values 44, and their target values 24. If too many variable-priced cryptographic tokens 30 are sold or exchanged and destroyed, there may be a greater number of the pegged cryptographic tokens 28 than desired (due to the creation operation 38 and/or the destruction operation 40) and an oversupply condition may exist. Simultaneously, or nearly simultaneously, the issuing authority 26 and/or the market exchange 32 may cooperate to reduce, or withdraw, the pegged cryptographic tokens 28 from the market exchange 32. The issuing authority 26, in other words, performs the destruction operation 40 to withdraw and destroy a desired quantity of the pegged cryptographic tokens 28 from the market exchange 32 to stabilize its current market value 44 to the target value 24. At nearly the same time, the issuing authority 26 may also perform the creation operation 38 to create a desired quantity of the variable-priced cryptographic tokens 30 and injects, or deposits, the newly-created variable-priced cryptographic tokens 30 into the market exchange 32, thus replenishing its population supply. These trades/exchanges may happen without delays imposed by deposits and withdraws as long as balances are setup ahead of time by the trader. Trades on the market exchange 32 and with the issuing authority 26 may be executed in parallel. Once the trades are executed and recorded (perhaps to blockchains 48a and/or 48b, as later paragraphs will explain), the issuing authority 26 deposits or replenishes the population supply or balance of the variable-priced cryptographic tokens 30 into the market exchange 32 to set the market exchange 32 up for the next arbitrage opportunity.

Exemplary embodiments thus stabilize the pegged cryptographic token 28. Because the exchange of the pegged cryptographic token 28 for the variable-priced cryptographic token 30 could vary greatly over time, the issuing authority 26 ensures enough variable-priced cryptographic tokens 30 are injected/provided for any transaction. These variable-priced cryptographic tokens 30 are created and the pegged cryptographic tokens 28 are destroyed. Moreover, the issuing authority 26 may also create any amount of the variable-priced cryptographic tokens 30 that are needed to maintain an equilibrium between the current market value 44 and the target value 24 of the pegged cryptographic token 28.

Exemplary embodiments use market forces. If the pegged cryptographic token 28 is trading low, then traders/holders in the market exchange 32 consider the pegged cryptographic token 28 to be devalued relative to the variable-priced cryptographic token 30. The market exchange 32 may have a pool of the pegged cryptographic tokens 28 and another pool of the variable-priced cryptographic tokens 30. The issuing authority 26 (e.g., a protocol or central authority off the market exchange 32) also has additional pools of the pegged cryptographic tokens 28 and the variable-priced cryptographic tokens 30. When the pegged cryptographic token 28 is devalued by the market exchange 32, demand is low and traders/holders will have a profit incentive to buy the pegged cryptographic token 28 at its low current market price or value 44, thus converting the pegged cryptographic token 28 to its equivalent number of variable-priced cryptographic tokens 30 (according to the cryptographic exchange rate 34). Because the issuing authority 26 may monitor the total number of the variable-priced cryptographic tokens 30, the issuing authority 26 may also, nearly simultaneously, buy an excess number of the variable-priced cryptographic tokens 30 to maintain a consistent supply or pool of the variable-priced cryptographic tokens 30. Recall that a buy order destroys the variable-priced cryptographic tokens 30 and creates or gains more pegged cryptographic tokens 28. Simply put, anytime a trader/holder and/or the issuing authority 26 can make money, market forces will push the current market price or value 44 up. An increasing market value 44 concomitantly increases the demand of the pegged cryptographic token 28, thus bringing the current market value 44 toward the target value 24.

Figure 4:
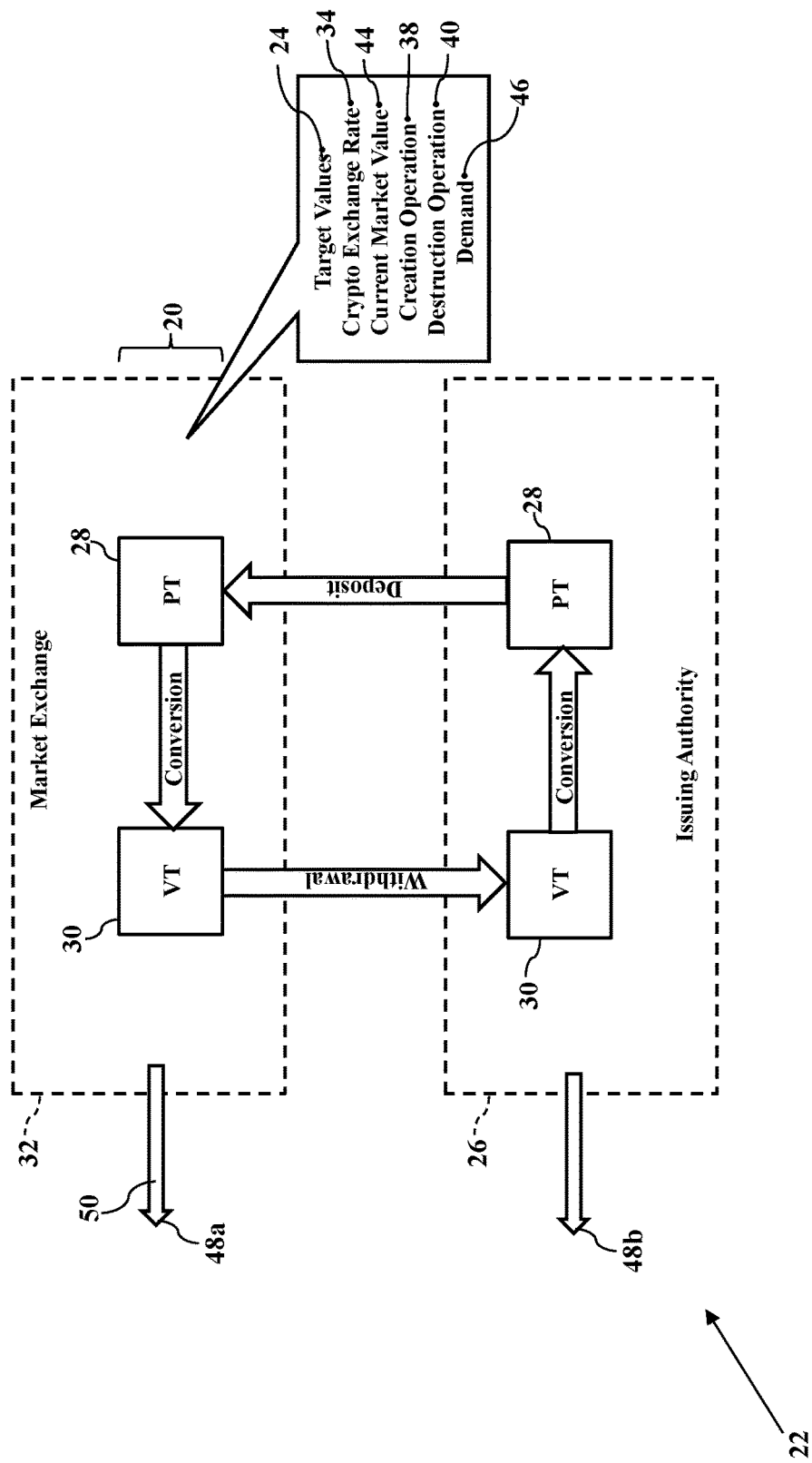

FIG. 4 illustrates an above-target scenario. Here the current, market value 44 of the pegged cryptographic token 28 is greater or higher than its desired target value 24. The demand 46 for the pegged cryptographic token 28 is increasing, so the pegged cryptographic token 28 may eventually be overvalued relative to the variable-priced cryptographic token 30 and/or to its target price or value 24. Holders of the pegged cryptographic token 28 have the sell opportunity to reap a profit, while traders see the buy opportunity in the variable-priced cryptographic token 30. The holders sell or exchange their pegged cryptographic tokens 28 for an equivalent number of the variable-priced cryptographic tokens 30 (according to the cryptographic exchange rate 34), thus realizing the profit. As the sales/exchanges are processed, demand for the pegged cryptographic token 28 decreases, thus reducing its current market value 44 toward its target value 24. Moreover, the demand 46 for the variable-priced cryptographic token 30 increases, thus increasing its current market value 44.

Population control may also be implemented. As the holders of the pegged cryptographic token 28 sell, the population pool or quantity of the pegged cryptographic tokens 28 in the market exchange 32 decreases. As the coinage trades proceed, the issuing authority 26 and/or the market exchange 32 may monitor the population supplies of the variable-priced cryptographic tokens 30, the pegged cryptographic tokens 28, their current market values 24, and their target values 24. If too many pegged cryptographic tokens 28 are sold or exchanged and destroyed, there may be a greater number of the variable-priced cryptographic tokens 30 than desired (due to the creation operation 38 and/or the destruction operation 40) and the oversupply condition may exist. Simultaneously, or nearly simultaneously, the issuing authority 26 and/or the market exchange 32 may cooperate to reduce, or withdraw, the variable-priced cryptographic tokens 30 from the market exchange 32. The issuing authority 26, in other words, performs the destruction operation 40 to destroy a desired quantity of the variable-priced cryptographic tokens 30 from the market exchange 32 to stabilize its current market value 44 to the target value 24. At nearly the same time, the issuing authority 26 performs the creation operation 38 to create a desired quantity of the pegged cryptographic tokens 28 and injects, or deposits, the newly-created pegged cryptographic tokens 28 into the market exchange 32, thus replenishing its population supply. These trades may then be recorded to the blockchain 48 (as later paragraphs will explain).

Market forces again prevail. If the value of the pegged cryptographic token 28 is high compared to its target value 24 and/or the variable-priced cryptographic token 30, then the pegged cryptographic token 28 may be sold on the market exchange 32 for the variable-priced cryptographic token 30. This sell operation results in a greater amount of the variable-priced cryptographic tokens 30 than the pegged cryptographic token 28 should allow. At the same time, a lesser amount of the variable-priced cryptographic tokens 30 can be exchanged for the same pegged cryptographic tokens 28 by the issuing authority 26, thus replenishing the supply of the pegged cryptographic tokens 28 in the market exchange 32.

The issuing authority 26 may thus be a market participant. However, the issuing authority 26 may participate for opposite market effects. When the issuing authority 26 trades between the pegged cryptographic tokens 28 and the variable-priced cryptographic tokens 30, the market effect of these trades is opposite to the trades on the market exchange 32. Suppose, for example, that a large number of the variable-priced cryptographic tokens 30 were sold for between the pegged cryptographic tokens 28 on the market exchange 32. The price of the variable-priced cryptographic token 30 necessarily goes down as the trade(s) consumes the order book for the variable-priced cryptographic token 30. On the other hand, a large number of the variable-priced cryptographic tokens 30 exchanged for the pegged cryptographic tokens 28 using the issuing authority 26 reduces the supply of the variable-priced cryptographic tokens 30 by that amount. Lowering the supply of the variable-priced cryptographic tokens 30 eventually increases the current market price 44 of the variable-priced cryptographic tokens 30. So, as the pegged cryptographic token 28 becomes popular as a stable value, the demand 46 for the pegged cryptographic token 28 is likely to rise, but the only way to create a bigger supply of the pegged cryptographic token 28 is through the conversation of the variable-priced cryptographic token 30 to the pegged cryptographic token 28, which lowers the supply of the variable-priced cryptographic token 30. On the other hand, if the value of the variable-priced cryptographic token 30 is in question and falls in the market exchange 32, conversion to the pegged cryptographic token 28 becomes attractive. All of these operations (e.g., the creation operation 38 and the destruction operation 40) increase the value of the variable-priced cryptographic token 30. As the value of the variable-priced cryptographic token 30 goes up, market participants will purchase the variable-priced cryptographic token 30 and thus further increase its value. But the demand 46 may also trigger the conversion of the pegged cryptographic token 28 to the variable-priced cryptographic token 30, and that conversion may dampen the growth in value of the variable-priced cryptographic token 30 by increasing the supply. Market arbitrage may be autonomous. The blockchain 48a may include so-called smart or digital contracts 50 that self-execute buy/sell trades according to predefined contractual parameters. The blockchain 48 may thus monitor the current market values 44 and/or the target values 24 for the variable-priced cryptographic token 30 and the pegged cryptographic token 28 and execute pre-defined buy and sell orders. Digital contracts 50 may thus be automated traders that buy and sell the cryptographic tokens 28 and 30. An entity or party may thus acquire more of the cryptographic tokens 28 and 30 than desired, while at the same time selling/destroying the cryptographic tokens 28 and 30 for a profit. The entity or party may thus configure their smart or digital contracts 50 to achieve financial goals, yet exemplary embodiments ensure that the current market value 44 and the target value 24 are stable and less likely to vary.

Exemplary embodiments are bondless. Neither the buyer, seller, nor the issuing authority 26 is required to post or provide a financial or coin bond, security, or other asset. Simply put, any party or entity, whether company, corporation, or individual person, may participate in the market exchange 32 and buy or sell the variable-priced cryptographic token 30 and the pegged cryptographic token 28. Indeed, exemplary embodiments may be applied to the market exchange 32 having a small number of only two (2) players or hundreds, thousands, or millions of participants.

Figure 5:
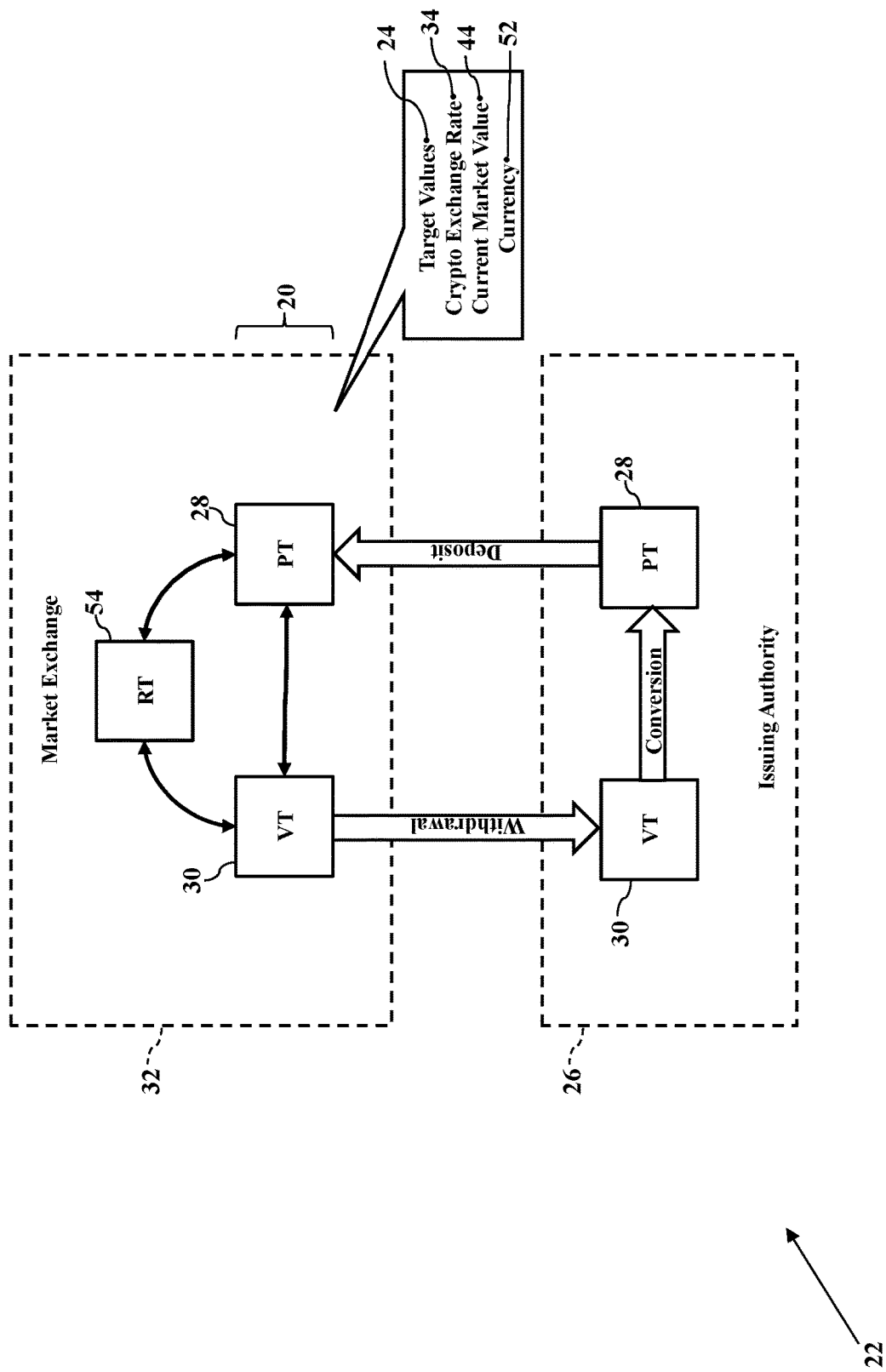

FIG. 5 further illustrates the pegged cryptographic token 28. As this disclosure above explained, the pegged cryptographic token 28 and the variable-priced cryptographic token 30 may have related values. The pegged cryptographic token 28, in other words, may be an encryption-secured digital medium of exchange whose value (e.g., the target value 24) is tied to some other asset or medium of exchange. The pegged cryptographic token 28, in particular, may be linked to any nation's currency 52 (such as the United States Dollar). The pegged cryptographic token 28, however, may be based on other assets, such as gold and other precious metals or even one or more other cryptographic coins. FIG. 5, for example, illustrates a reference cryptographic token (or "RT") 54 which may also be freely traded on the market exchange 32. The market exchange 32 may thus establish or set the values of the variable-priced cryptographic token 30 and the pegged cryptographic token 28 in relative terms to the reference cryptographic token 54. The cryptographic exchange rate 34, in other words, may be defined based on the relative values between the pegged cryptographic token 28, the variable-priced cryptographic token 30, and the reference cryptographic token 54. The reference cryptographic token 54 may thus only be used as a reference point. The pegged cryptographic token 28 may be valued in relation to the Consumer Price Index ("CPI") adjusted to the United States Dollar. The issuing authority 26 may thus manage the cryptographic exchange rate 34 between the pegged cryptographic token 28 and the variable-priced cryptographic token 30, and the cryptographic exchange rate 34 drives the arbitrage that stabilizes the pegged cryptographic token 28.

Figure 6:
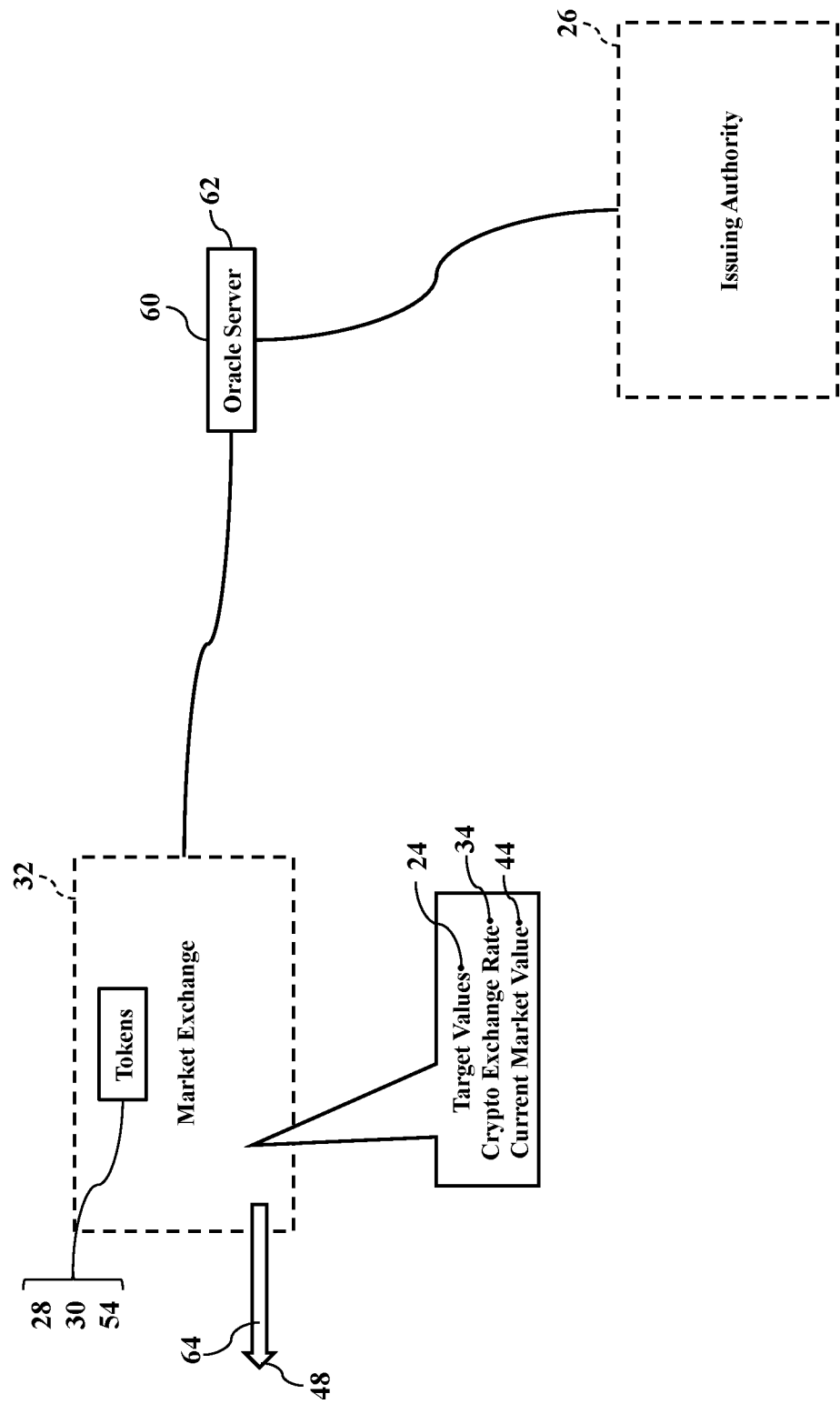
Figure 7:
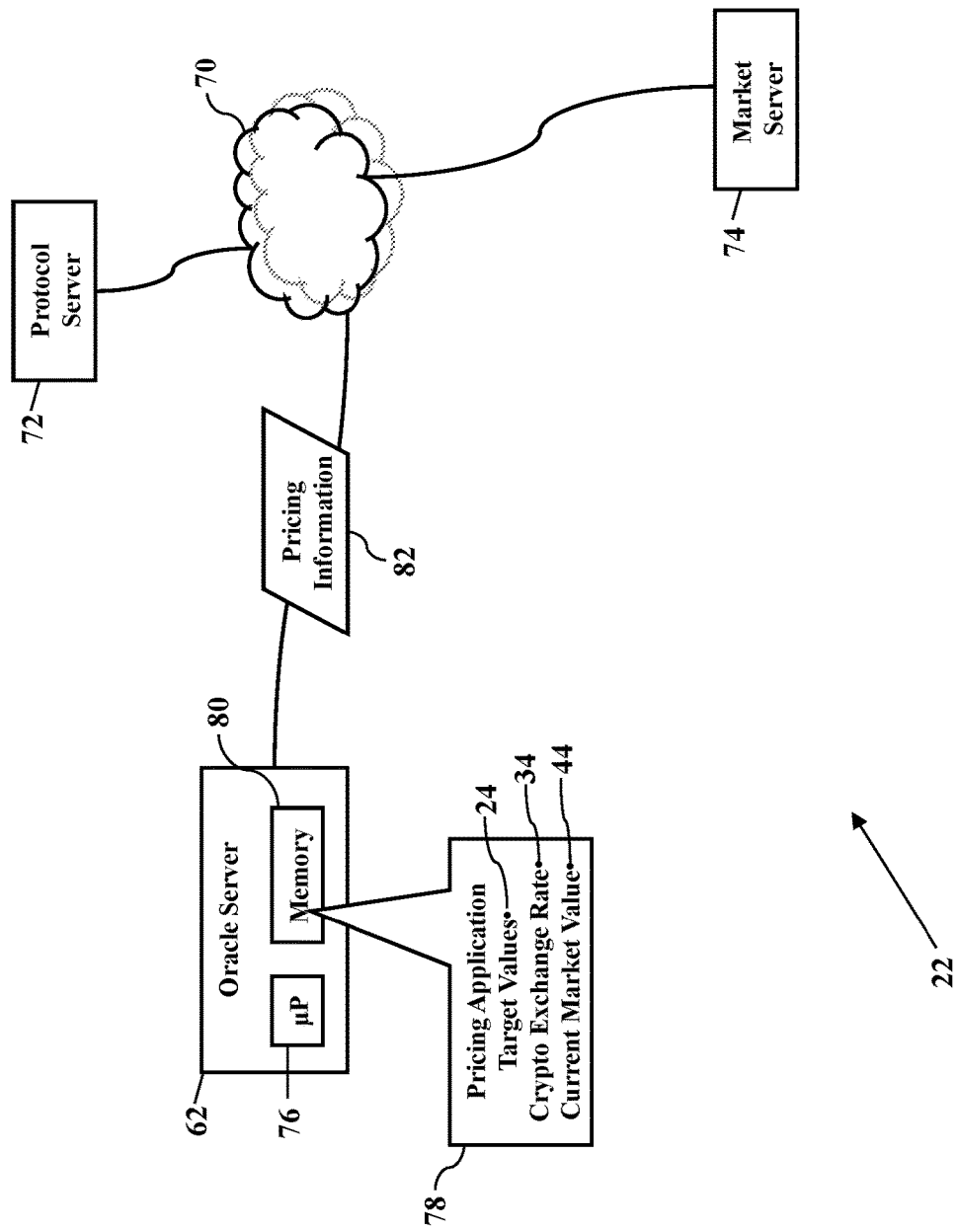

As FIG. 6 further illustrates, an oracle 60 may publish the current market values 44. As the market exchange 32 operates, the current market values 44 of the pegged cryptographic token 28, the variable-priced cryptographic token 30, and/or the reference cryptographic token 54 need to be discovered and dispersed to the market participants. Blockchain miners and other federated servers may find it inefficient to continuously and/or repeatedly query the market exchange 32 for current pricing. Moreover, these pricing queries would contribute to packet congestion in a communications network serving or accessing the market exchange 32. Pricing stability may require a faster and simpler mechanism for pricing discovery. Exemplary embodiments, then, may utilize any query mechanism to discover the current market values 44 of the cryptographic tokens 28, 30, and/or 54. One or more oracle servers 62, for example, may communicate with the market exchange 32 and with the issuing authority 26. The oracle servers 62 perform an oracle function that provides historical and/or the current market values 44 of the cryptographic tokens 28, 30, and/or 54. Any participant of the market exchange 32, and the issuing authority 26, may send a query to the oracle server 62 and retrieve current market values 44, the cryptographic exchange rate 34, and/or the target values 24. Indeed, there may be multiple or different cryptographic exchange rates 34, perhaps reflecting value spreads when converting "VT" 30 to "PT" 28 or when converting "PT" 28 to "VT" 30. The market exchange 32 thus establishes market values for the cryptographic tokens 28, 30, and/or 54. The blockchain 48 may additionally or alternative publish pricing information as a transaction in a block 64 of data, which allows the smart, digital contract 48 to remotely attest that the pricing information is accurate.

Exemplary embodiments may also permit multiple coinage trades. That is, participants in the market exchange 32 may buy and sell many different cryptocurrencies and assets. For example, the synthetic pair 36 may actually be associated multiple pegged cryptographic tokens 28 and/or multiple variable-priced cryptographic tokens 30. The synthetic pair 36 may thus be bought and sold as a single trade or transaction involving the tokens 28 and 30, and that single transaction may be recorded to the blockchain 48. Indeed, a single variable-priced cryptographic token 30 may be paired with several or many pegged cryptographic tokens 28, and the pegged cryptographic tokens 28 may be associated with different issuing authorities 26 (such as BITCOIN®, ETHEREUM®, RIPPLE®, or other cryptographic coin mechanisms).

Pegging to the Consumer Price Index allows for a virtual distributed market. Coinage trades need not be between people, as exemplary embodiments would push collateral from one pegged cryptographic token 28 to another. Suppose, for example, that the pegged cryptographic token 28 is tied or associated with the Dow Jones Industrial Average ("DJIA") as a token pair against the variable-priced cryptographic token 30, gold, a BITCOIN® token, and the US Dollar. Then, if a holder wanted to be in US Dollars, the holder need only push or convert value over into dollars. If the holder wanted to be in the DJIA, the holder could push and convert into shares or holdings in the DJIA. The positional changes increase the value of the variable-priced cryptographic token 30 because, the only way in is burn the variable-priced cryptographic token 30 out of existence. The holder pushes the supply down, thus increasing the demand interest in the distributed market exchange 32. The holder has thus necessarily created the higher price of the variable-priced cryptographic token 30 in order to get her assets into the system. Merely buying on the market exchange 32 creates a price that allows the holder to get into the variable-priced cryptographic token 30. Furthermore, as the holder moves out of the variable-priced cryptographic token 30 into other assets or tokens, the holder necessarily burns the supply down. Thus, moving into the pegged cryptographic token 28 reinforces the supply of the underlying variable-priced cryptographic token 30.

Exemplary embodiments may also limit risk. Buying, selling, and destroying the variable-priced cryptographic token 30 only risks the collateral that is in the system. In other words, if the variable-priced cryptographic token 30 is only priced at five dollars ($5.00) at a start of trading, the holder has no risk from the pegged cryptographic token 28, as no pegged cryptographic token 28 exists or has been created. However, as participants buy the variable-priced cryptographic tokens 30, in order to get into the pegged cryptographic token 28 system, the market exchange 32 will push up the price of the variable-priced cryptographic token 30. If a holder should liquidate, then obviously the supply of the variable-priced cryptographic token 30 increases and the price drops. So, as people don't want to have the variable-priced cryptographic token 30, demand drops and the price lowers. However, if market participants desire the variable-priced cryptographic token 30, they raise the price.

Trust is important. If the pricing information provided by the oracle server 62 and/or by the blockchain 48 is untrusted or unreliable, the market exchange 32 may fail. Trust may thus depend on any participant's ability to audit and prove the distributed nature of the oracle servers 62, the historical and current market values 44 they collect over time, and the application of the pricing data to trades by the issuing authority 26.

Additional observations on stabilization are provided. If the variable-priced cryptographic token 30 loses significant value, traders may flee or liquidate and convert to the pegged cryptographic token 28 (to escape the falling value of the variable-priced cryptographic token 30). However, this conversion may destroy a significant quantity of the variable-priced cryptographic tokens 30, thus reducing its supply in the market exchange 32. A reduction in supply, in turn, may cause significant inflation in the current market value 44 of the variable-priced cryptographic token 30. Again, then, the destruction operation 40 provide by exemplary embodiments helps stabilize current market value 44.

Demand further influences stabilization. Suppose that the utility of the pegged cryptographic token 28 is significant, implying that many market participants demand ownership positions. The market participants, in other words, may want to acquire the variable-priced cryptographic token 30 as the only gateway to create the pegged cryptographic token 28 (via the destruction operation and the creation operation 38, as above explained). Demand for the variable-priced cryptographic token 30, in other words, increases, thus increasing its current market value 44. However, if the current market value 44 significantly increases, holders of the pegged cryptographic token 28 may be tempted to convert their pegged cryptographic tokens 28 to the variable-priced cryptographic tokens 30, particularly if the trade volume is not high and a thin market depth provides an advantage. However, such a trade on the issuing authority tends to lower the price (e.g., the current market value 44) by increasing the supply of the variable-priced cryptographic tokens 30.

Exemplary embodiments may thus impose limits. At any point in time, the ability to inflate the current market value 44 of the variable-priced cryptographic token 30 is limited by the value and quantity of the pegged cryptographic token 28. Similarly, the supply of the pegged cryptographic tokens 28 is limited by the value of the variable-priced cryptographic token 30. The stability of the pegged cryptographic token 28 may thus be dependent not just on the accuracy of the oracle servers 62 used by the issuing authority 26, but stability may also depend on the extent to which the price on the market exchange 32 matches the value provided nu the oracle(s). In truth, prices of tokens and assets will vary across different exchanges, and arbitrage opportunities exist for all trading as a result. The pegged cryptographic token 28 then can be expected to be close to the value of the reference cryptographic token 54, but unlikely to be perfectly pegged to the value of the reference cryptographic token 54.

Exemplary embodiments may introduce time delay. Trades conducted by, or ordered by, the issuing authority 26 may necessarily be delayed in time, due to the time required for the oracle server(s) 62 to provide their pricing information. This delay, especially if random, thwarts traders who attempt to front run or anticipate upcoming, future trades by the issuing authority 26. This uncertainty may be a feature, as predictability is necessary to game automatic systems. So, when a buy/sell order is placed, the buyer/seller may have to wait some period of time before that order picks up the oracle price to suppress or thwart front-running. The time delay, though, may be limited or maxed out, as too long of a delay may dampen or hinder the ability of the market exchange 32 to correct prices.

The pegged cryptographic token 28 need not traded on the market exchange 32. Upon launch of the pegged cryptographic token 28, where the variable-priced cryptographic token 30 is traded on the market exchange 32, other observations may be noted. Holders of the variable-priced cryptographic token 30 can move the variable-priced cryptographic token 30 to the pegged cryptographic token 28 using the services of the issuing authority 26 to escape currency risk when the variable-priced cryptographic token 30 is falling in value. This removes the variable-priced cryptographic token 30 from the market exchange 32, thus reducing its market supply and supporting the current market value 44 of the variable-priced cryptographic token 30. At the same time, the pegged cryptographic token 28 holds its current market value 44 (perhaps relative to its target value 24 or to the reference cryptographic token 54). Exemplary embodiments thus provide a safe harbor for treasury management purposes.

For example, suppose a traditional cryptocurrency "A" supports the pegged cryptographic token 28 pegged to the US Dollar. When the cryptocurrency A is slipping in value, the cryptocurrency A can be converted to the pegged cryptographic token 28 with a simple electronic wallet transaction. It should be noted that converting the cryptocurrency A to the pegged cryptographic token 28 lowers the supply of the cryptocurrency A, tending to support the price of the cryptocurrency A. When the price of the cryptocurrency A is rising, a party that moved to the pegged cryptographic token 28 can move back into the cryptocurrency A. This does cause inflation in the cryptocurrency A, so such moves will tend to lower the price of the cryptocurrency A, leading to a steadier value, and discouraging large movements from the pegged cryptographic token 28 to the cryptocurrency A. If the cryptocurrency A and the pegged cryptographic token 28 are part of an investment portfolio, these conversions can be done without involving the market exchange 32 or looking for buyers. If the cryptocurrency A is used for funding operations or paying for goods and services, the pegged cryptographic token 28 provides a logical mechanism for these transactions, as it has a predictable price over time.

Both the pegged cryptographic token 28 and the variable-priced cryptographic token 30 may be traded on the market exchange 32. For miners of operators of a public blockchain that have expenses to pay, conversion to US Dollars may be desired. However, they also have a vested interest in maintaining the price of the variable-priced cryptographic token 30. A conversion of the variable-priced cryptographic token 30 to the pegged cryptographic token 28 supports the price of the variable-priced cryptographic token 30 (their likely unit of support), and the pegged cryptographic token 28 can be moved to an exchange and liquidated for an expected value more easily. If the variable-priced cryptographic token 30 is falling in value over time, the pegged cryptographic token 28 becomes an increasingly attractive option, and can be executed in a reasonably predictable transaction compared to exchanges. At the same time, such conversions support the price of the variable-priced cryptographic token 30. If the variable-priced cryptographic token 30 is rising in price, purchasing on the market exchange 32 will support the price, while conversion of the pegged cryptographic token 28 to the variable-priced cryptographic token 30 will tend to slow gains in the variable-priced cryptographic token 30. For those interested in investing in the variable-priced cryptographic token 30, transactions in the market exchange 32 make more sense.

Exemplary embodiments may include treasury management. Any entity (such as the market exchange 32 and/or the issuing authority 26) may allocate the dollar-denominated pegged cryptographic token 28, plan a period of usage, monitor market conditions, and adjust an exposure to the variable-priced cryptographic token 30 versus the stability of the pegged cryptographic token 28. Exemplary embodiments may manage pricing, demand, and supply of the variable-priced cryptographic token 30, even if no one is trading the pegged cryptographic token 28, because the protocol (executed by the issuing authority 26) respects it.

Exemplary embodiments may also thwart sell loops. Suppose a holder owns or holds a large amount or quantity of the variable-priced cryptographic tokens 30. The holder, of course, may sell the variable-priced cryptographic tokens 30, thus converting to some quantity of the pegged cryptographic token 28. This sell operation lowers the current market price of the variable-priced cryptographic tokens 30. Now the holder has a resulting quantity of the pegged cryptographic tokens 28. The holder may then withdraw the pegged cryptographic tokens 28 from the market exchange 32 (such as moving the pegged cryptographic tokens 28 to her electronic wallet). Later in time, the holder could move the pegged cryptographic tokens 28 from her electronic wallet and exchange back into the variable-priced cryptographic tokens 30. This conversion inflates the supply of the variable-priced cryptographic tokens 30 in the market exchange 32. In theory, then, the holder could repeat this sell scheme to attack the current market value 44 of the variable-priced cryptographic tokens 30 and/or the pegged cryptographic token 28. However, a problem with this attack includes the fact that the attacker needs quite a bit of funds, and the cryptographic tokens 28 and/or 30 may lose value with each cycle. Moreover, the market participants may police actions. When the price of the variable-priced cryptographic token 30 falls, other participants may also convert to the pegged cryptographic token 28, thus lowering the supply. This collective market action my even negate the attacker's sell loop attack.

Preservation of wealth prevails. The attacker is trying to inflate the value of the variable-priced cryptographic token 30 or the pegged cryptographic token 28, depending on position. The holder tries to sell the variable-priced cryptographic token 30 on the market exchange 32, thus forcing down its price and acquiring the pegged cryptographic token 28. The attacker may then approach the issuing authority 26 and sell the pegged cryptographic token 28 back into the variable-priced cryptographic token 30, which inflates the supply. The attacker can then upload the higher volume to the market exchange 32 repeat the sell cycle, as the market participants see the supply inflate and that is a downward pressure. However, this attack process also raises the supply of variable-priced cryptographic token 30, which necessarily burns down the supply of the pegged cryptographic tokens 28. Ultimately, then, this sell cycle would exhaust the entire supply of the pegged cryptographic tokens 28, and the sell cycle costs the attacker money. The attacker will be successful to the extent that he/she loses money. However, as the variable-priced cryptographic tokens 30 are sold to drive down the price, other market participants will panic and move into the pegged cryptographic tokens 28. As the price of the variable-priced cryptographic tokens 30 falls, other market participants buy the pegged cryptographic tokens 28, thus also burning down the supply of the variable-priced cryptographic tokens 30. So, while the attacker is trying to inflate the supply, other market participants can be working against the attacker to burn the supply down. Simply put, the other market participants are preserving their wealth.

Exemplary embodiments may also apply to nation-state governments. Countries with hyperinflation and a central bank struggle to create a platform by which businesses and their markets can transact. The conditions and constraints involved vary widely from country, but exemplary embodiments may be applied by national governments to improve currency management. Any country with a national currency needs to have its value stabilized, and a possible secondary token can be used to carry out business in the immediate term. So, assume that a transaction currency (e.g., a "USDpeg" is a national currency pegged to the United States Dollar), implemented with an indirect pegging to the United States Dollar and managed and controlled by the central bank, is a desired solution. First, the national currency would have to be available on a free exchange to establish a real exchange rate with the United States Dollar. Second, the Central bank would provide services to convert the national currency at the market exchange rate into the USDpeg currency. Third, the Central bank would provide services to convert the USDpeg currency at the market exchange rate into the national currency. Fourth, the only mechanism to generate the USDpeg currency would be the conversion of the national currency to the USDpeg currency. As businesses and transactions move to the USDpeg, the supply of the national currency would be reduced, and the value of the national currency should be supported. The concern would be for the national currency to become worthless on the market. Some amount of fiscal responsibility around managing the supply of the national currency may be required. However, stability in business and the market could be attained quicker and in parallel with fiscal reforms rather than putting off stability until reforms are in place.

Exemplary embodiments overcome a loss in confidence. As the reader may understand, a loss in confidence in any stable token may create a downward spiral, where market forces drive value to low or even historic lows. With an indirect pegged token (such as the variable-priced cryptographic token 30), though, the value of the pegged cryptographic token 28 is lower than the variable-priced cryptographic token 30 that supports it. Arbitrage allows users to diminish the supply of the pegged cryptographic token 28 to attain more variable-priced cryptographic tokens 30 from the issuing authority 26 than the trade of the variable-priced cryptographic token 30 for pegged cryptographic token 28 on the market exchange 32 allows. Arbitrage will allow the trader to gain in the variable-priced cryptographic tokens 30 at the expense of lowering the supply of the pegged cryptographic token 28. While selling the pegged cryptographic token 28 on the market exchange 32 to get out of the pegged cryptographic token 28 will be a solution for many, exemplary embodiments provide an arbitrage opportunity for traders to profit, but necessarily lowers the supply of the pegged cryptographic token 28 in the process. When both the variable-priced cryptographic token 30 and the pegged cryptographic token 28 fall in value, and the variable-priced cryptographic token 30 falls faster than arbitrage can be leveraged for profit, traders could shift to selling off both the variable-priced cryptographic token 30 and the pegged cryptographic token 28 on the exchanges, and both the variable-priced cryptographic token 30 and the pegged cryptographic token 28 could go to zero. This could happen with any issuing authority with irresponsible monetary policy for the variable-priced cryptographic token 30.

Still more observations are provided. Any oracle (such as an operator of the oracle server 62 or other service provider) may be as simple as members of any community polling and reporting using application programming interfaces (or "APIs") provided by the market exchange 32. If the oracle requires time for pricing information to settle and record, conversions between the variable-priced cryptographic token 30 and the pegged cryptographic token 28 may be delayed in order to use future exchange rates to avoid front running by holders watching and gaming the market. Transactions may be recorded (perhaps in the blockchain 48) at the beginning of the delay, but the transactions may be later executed using the current price at the end of the delay. On the blockchain 48, the cryptocurrency exchange rate(s) 34 (perhaps gathered from the oracle server 62) may be logged over time to provide an audit trail, perhaps including conversions details (e.g., time, GPS location, quantity, the current market price 44, and buy/sell parties) and even the time delay implemented or enforced by the issuing authority 26. Because the issuing authority 26 can create the variable-priced cryptographic token 30 as needed, the conversion of the pegged cryptographic token 28 to the variable-priced cryptographic token 30 is always possible. Because the pegged cryptographic token 28 is desired by parties performing transactions over time, for many use cases the variable-priced cryptographic token 30 may need to first be converted to the pegged cryptographic token 28. This destroys the variable-priced cryptographic token 30, while relatively simultaneously supporting the value of the variable-priced cryptographic token 30 by reducing the quantity or supply of the variable-priced cryptographic token 30. Arbitrage for the pegged cryptographic token 28 and/or the variable-priced cryptographic token 30 in the exchange market 32, and coinage conversions between the pegged cryptographic token 28 and the variable-priced cryptographic token 30 by the issuing authority 26, maintains the value of the pegged cryptographic token 28 (perhaps at any value pegged to the reference cryptographic token 54).

Even more observations are provided. Exemplary embodiments may be implemented by any central bank. Exemplary embodiments may be implemented by a smart contract and/or a blockchain protocol (such as the blockchain 48). The pegged cryptographic token 28, the variable-priced cryptographic token 30, and/or the reference token 54 may be a real world currency, a cryptocurrency implemented by a blockchain, a token issued on a blockchain, or any other asset or commodity or security as long as the issuing authority has a realistic ability to issue the pegged cryptographic token 28, the variable-priced cryptographic token 30, and/or the reference token 54 without fail according to the creation operation 38 and the destruction operation 40 (as earlier explained). In the cryptocurrency market, the concept of a stable coin is a coin that has a constant value relative to one of the real-world currencies (such as the US Dollar, Euro, Yen, Yuan, etc.). If the reference token 54 is the U.S. Dollar, then the reference token 54 becomes a stable coin pegged to the U.S. Dollar.

Exemplary embodiments may include transactional sharding. If implemented on a blockchain at the protocol level, transactions involving the pegged cryptographic token 28 may be restricted to a single input account address to allow transactional sharding. If any cryptographic coinage transaction specifies a single or multiple input account addresses and a single or multiple output account addresses, then the cryptographic coinage transaction may be transactionally sharded (e.g., each transactional shard handles a particular set of addresses to validate a transaction input is valid). Once the input account address has been decremented as required as a result of the transaction, the output account addresses may be updated by messaging between shards. This approach requires the transaction processing mechanism of the blockchain to track and validate all shards, but a party interested in validating the balance of an address need only validate the updates of the address in the shard responsible for that address. The transaction would be referenced by all shards involved. Transactional sharding is further explained by U.S. application Ser. No. 16/116,991 filed Aug. 30, 2018 and entitled "Transactional Sharding of Blockchain Transactions," which is incorporated herein by reference in its entirety.

Yet more observations are provided. If the variable-priced cryptographic token 30 supports multiple pegged cryptographic tokens 28 (where, for example, one pegged cryptographic token 28 is pegged to the U.S. Dollar, another is pegged to BTC, another to the EUR, another to the price of Gold, etc.) then these synthetic pairs can be traded against each other on exchanges. Trading of the pegged cryptographic token 28 on any exchange (such as the market exchange 32) may have two paths for exchange to its the reference cryptographic token 54. A trading pair (such as the pegged cryptographic token 28 and the reference cryptographic token 54) would allow the reference cryptographic token 54 to be purchased for the pegged cryptographic token 28. Absent a trading pair, purchase of a liquid token (such as the BITCOIN®) could be used to sell for the reference cryptographic token 54 like the U.S. Dollar. The pegged cryptographic token 28 may be converted to the variable-priced cryptographic token 30 by the issuing authority 26, and the variable-priced cryptographic token 30 moved onto an exchange and traded for the reference cryptographic token 54 directly, or through a liquid token like BITCOIN® for conversion to the reference cryptographic token 54 like the U.S. Dollar. A blockchain implementation at the protocol level has many advantages for defining and trading the pegged cryptographic token 28 because of the ability of users to audit supplies of variable-priced cryptographic token 30 and pegged cryptographic token 28, audit historical Oracle data used and Pegging Token Operations.

Exemplary embodiments thus describe decentralized, two-cryptocoinage mechanism for stability in value. Exemplary embodiments may be protocol enforced according to an algorithm, with little or no human intervention or judgment. Exemplary embodiments thus implement a monetary policy by a decentralized bank for stable cryptocurrency coinage.

Figure 8:
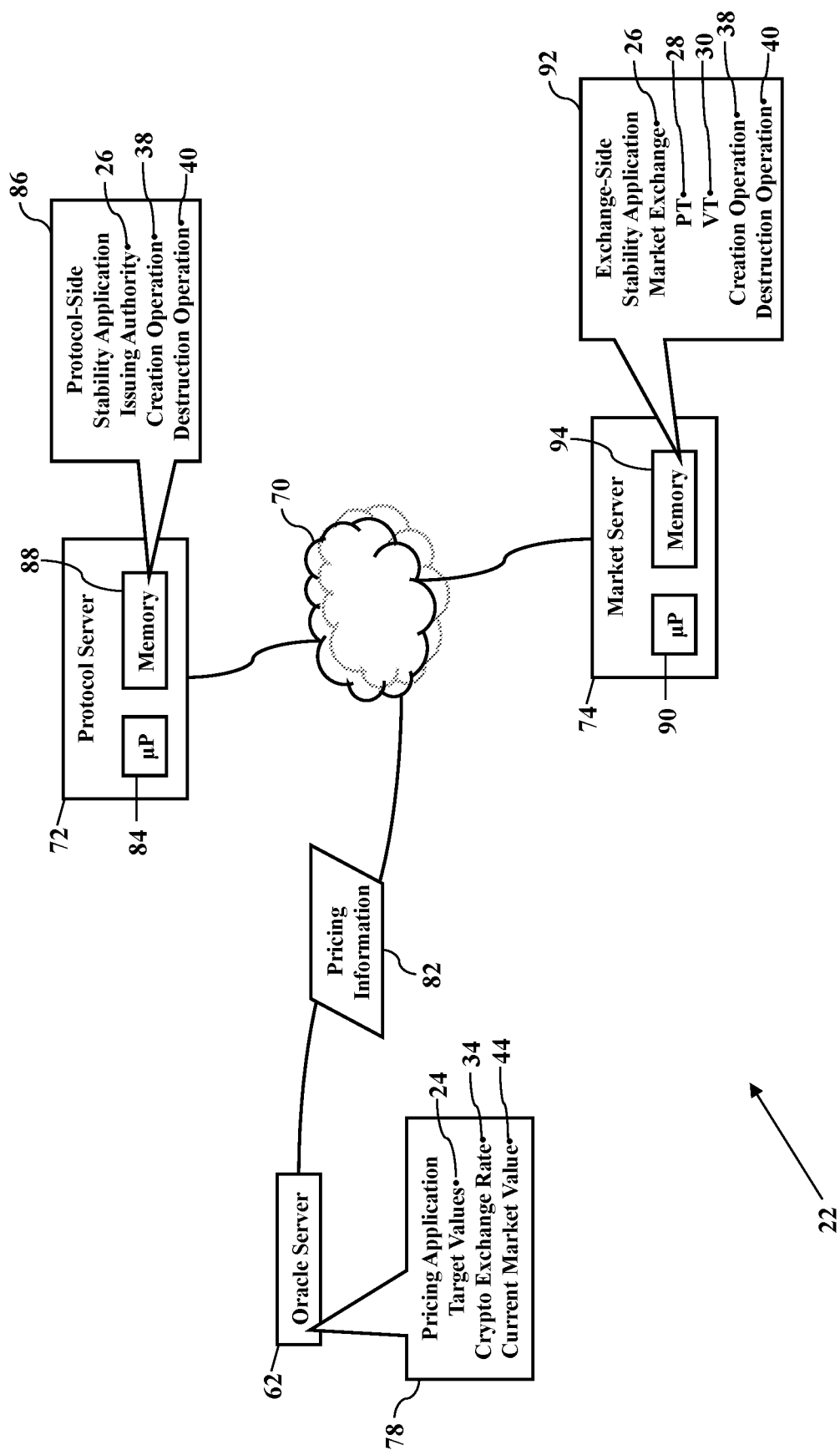
FIGS. 8-10 are more detailed illustrations of an operating environment, according to exemplary embodiments.
Figure 9:
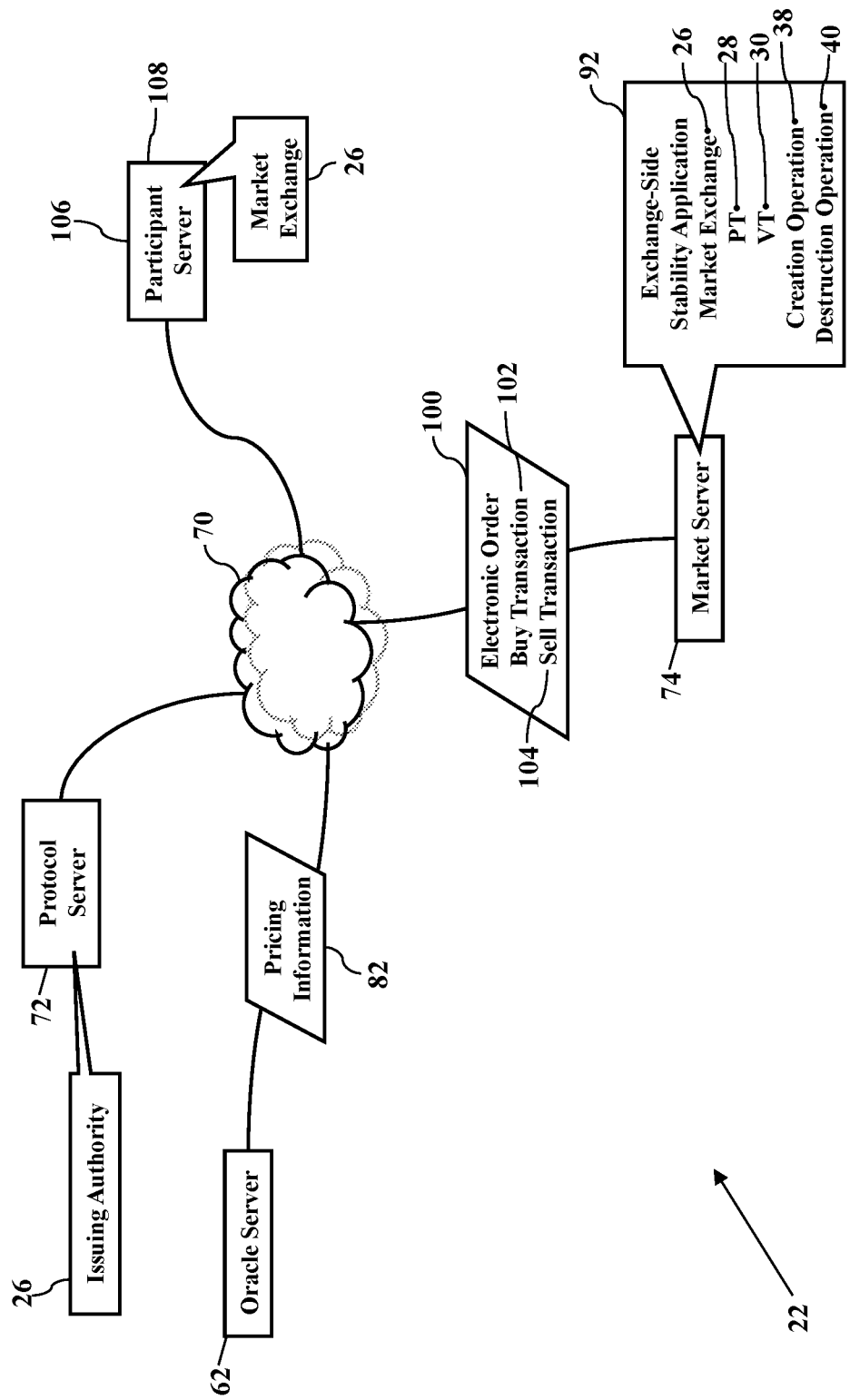
Figure 10:
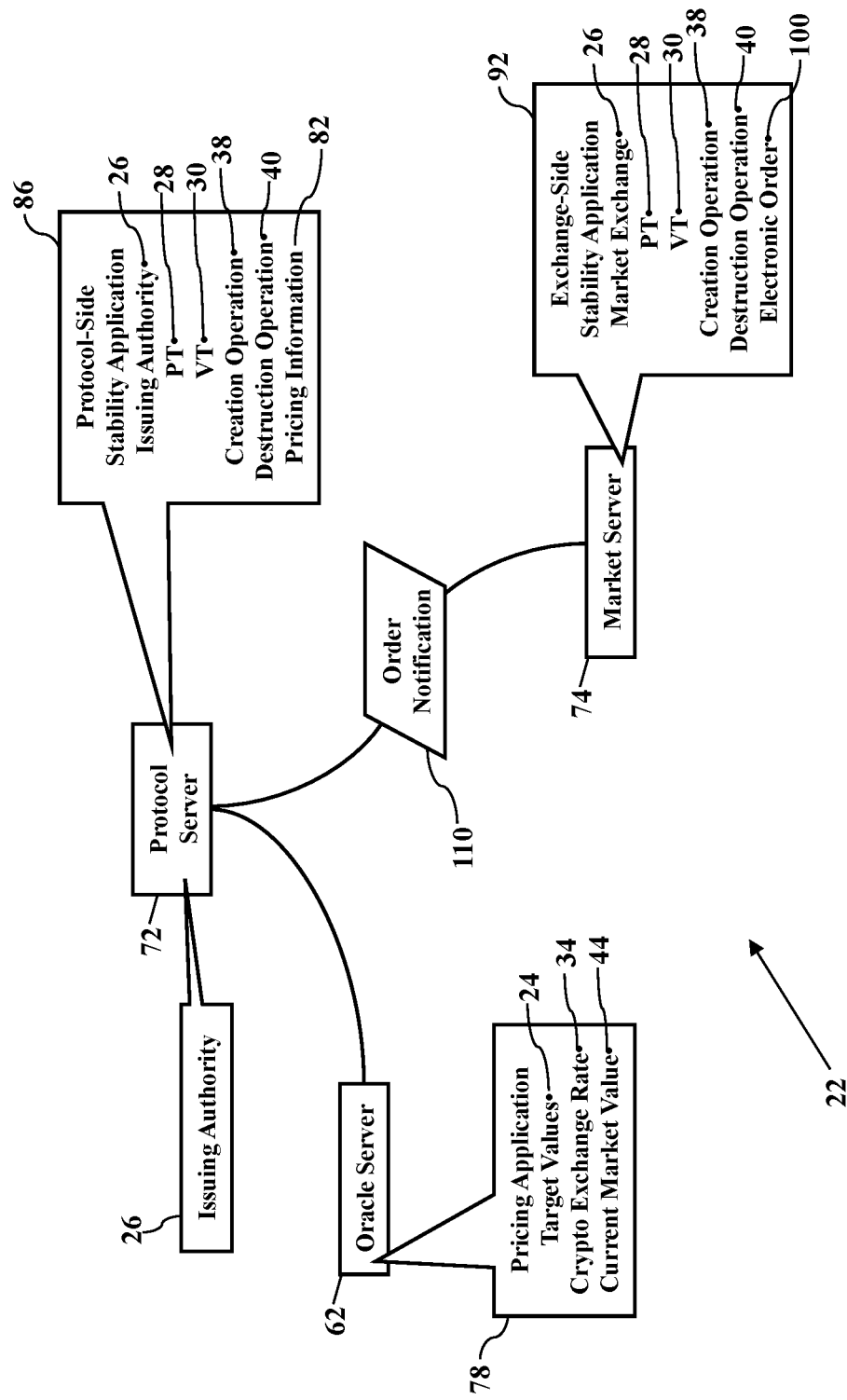

FIGS. 8-10 are more detailed illustrations of an operating environment, according to exemplary embodiments. FIG. 8 illustrates the oracle server 62 communicating via a communications network 70 with a protocol server 72 and with a market server 74 in the blockchain environment 22. The oracle server 62 has a processor 76 (e.g., "μP"), application specific integrated circuit (ASIC), or other component that executes a pricing application 78 stored in a local, solid-state memory device 80. The oracle server 62 has a network interface (not shown for simplicity) to the communications network 70, thus allowing two-way, bidirectional communication. The pricing application 78 includes instructions, code, and/or programs that cause the oracle server 62 to perform operations, such as sending pricing information 82 to the protocol server 72 and/or to the market server 74. The pricing information 82 may include the current market values 44 and the target values 24 of the pegged cryptographic token 28 and the variable-priced cryptographic token 30. The pricing information 82 may include the cryptographic exchange rate 34 between the pegged cryptographic token 28 and the variable-priced cryptographic token 30. The oracle server 62 may feed the pricing information 82 on a periodic or random timing basis. However, the protocol server 72 and/or the market server 74 may send queries via the communications network 70 to the network or IP address associated with the oracle server 62, and the queries specify a query parameter that requests the latest and/or historical pricing information 82. The oracle server 62 may then retrieve and send the pricing information 82 as a query response.

FIG. 8 illustrates the protocol server 72 and the market server 74. These servers 72 and 74 may cooperate to achieve algorithmic monetary policy. The protocol server 72 may be operated by, or on behalf of, the issuing authority 26. The protocol server 72 has a processor 84 (e.g., "μP"), application specific integrated circuit (ASIC), or other component that executes a protocol-side stability application 86 stored in a local, solid-state memory device 88. The protocol server 72 has a network interface (not shown for simplicity) to the communications network 70, thus allowing two-way, bidirectional communication. The protocol-side stability application 86 includes instructions, code, and/or programs that cause the protocol server 72 to perform operations, such as performing the creation operation 38 and/or the destruction operation 40.

The market server 74 is also processor-controlled. The market server 74 is operated by, or on behalf of, the market exchange 32. The market server 74 has a processor 90 (e.g., "μP"), application specific integrated circuit (ASIC), or other component that executes an exchange-side stability application 92 stored in a local, solid-state memory device 94. The market server 74 has a network interface (not shown for simplicity) to the communications network 70, thus allowing two-way, bidirectional communication. The exchange-side stability application 92 includes instructions, code, and/or programs that cause the market server 74 to perform operations, such as performing the creation operation 38 and/or the destruction operation 40. The protocol-side stability application 86 and the exchange-side stability application 92 may thus cooperate to maintain stability between the current market values 44 and the target values 24 of the pegged cryptographic token 28 ("PT") and/or the variable-priced cryptographic token 30 ("VT").

FIG. 9 illustrates additional details. The market server 74 receives an electronic order 100 that specifies a buy transaction 102 and/or a sell transaction 104. While the electronic order 100 may be sent from any entity, FIG. 9 illustrates a participant server 106 operated on behalf of a market participant 108. That is, the market participant 108 is a member of the market exchange 32, and the participant server 106 is registered and/or authorized to submit the electronic order 100 specifying a buy or sell of a quantity or number of the pegged cryptographic token 28 and/or the variable-priced cryptographic token 30. The market server 74 obtains, reads, or retrieves the pricing information 82 and processes and/or executes the electronic order 100. That is, the market server 74 processes and/or executes the creation operation 38 and/or the destruction operation 40 according to the cryptographic exchange rate 34.

Cryptographic conversion may occur. For example, the participant server 106 may request that the market exchange 32 and/or the issuing authority 26 covert a certain number of the variable-priced cryptographic token(s) 30 to the pegged cryptographic token(s) 28 at the current cryptographic exchange rate 34. As another example, the participant server 106 may request that the market exchange 32 and/or the issuing authority 26 convert a requested number of the pegged cryptographic token(s) 28 into the variable-priced cryptographic token(s) 30 at the current cryptographic exchange rate 34. The market exchange 32 and/or the issuing authority 26 may thus create or destroy the variable-priced cryptographic token(s) 30 and/or the pegged cryptographic token(s) 28, according to the creation operation 38 and/or the destruction operation 40.

FIG. 10 illustrates near real time supply management. Whenever the market server 74 receives the electronic order 100 (specifying the buy transaction 102 and/or the sell transaction 104, as FIG. 9 illustrated), the market server 74 may notify the protocol server 72. The market server 74, for example, may send an order notification 110 to the network or Internet Protocol address associated with the protocol server 72. The order notification 110 may include or specify the quantity or number of the pegged cryptographic token 28 and/or the variable-priced cryptographic token 30 to be bought or sold. The order notification 110 may include or specify the pricing information 82 at which the pegged cryptographic token 28 and/or the variable-priced cryptographic token 30 is bought or sold. Additionally or alternatively, the protocol server 72 may query the oracle server 62 for the pricing information 82. Regardless, when the protocol server 72 receives or is informed of the order notification 110, the protocol server 72 may deposit or withdraw one or more pegged cryptographic token 28 to/from the market exchange to stabilize its current market value 44 to its target value 24. Likewise, the protocol server 72 may deposit or withdraw one or more variable-priced cryptographic tokens 30 to/from the market exchange to stabilize its current market value 44 to its target value 24.

Exemplary embodiments may be applied regardless of networking environment. Exemplary embodiments may be easily adapted to stationary or mobile devices having cellular, wireless local area networking capability (such as WI-FI®), near field, and/or BLUETOOTH® capability. Exemplary embodiments may be applied to mobile devices utilizing any portion of the electromagnetic spectrum and any signaling standard (such as the radio spectrum and IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When any device or server communicates via the communications network 70, the device or server may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 11:
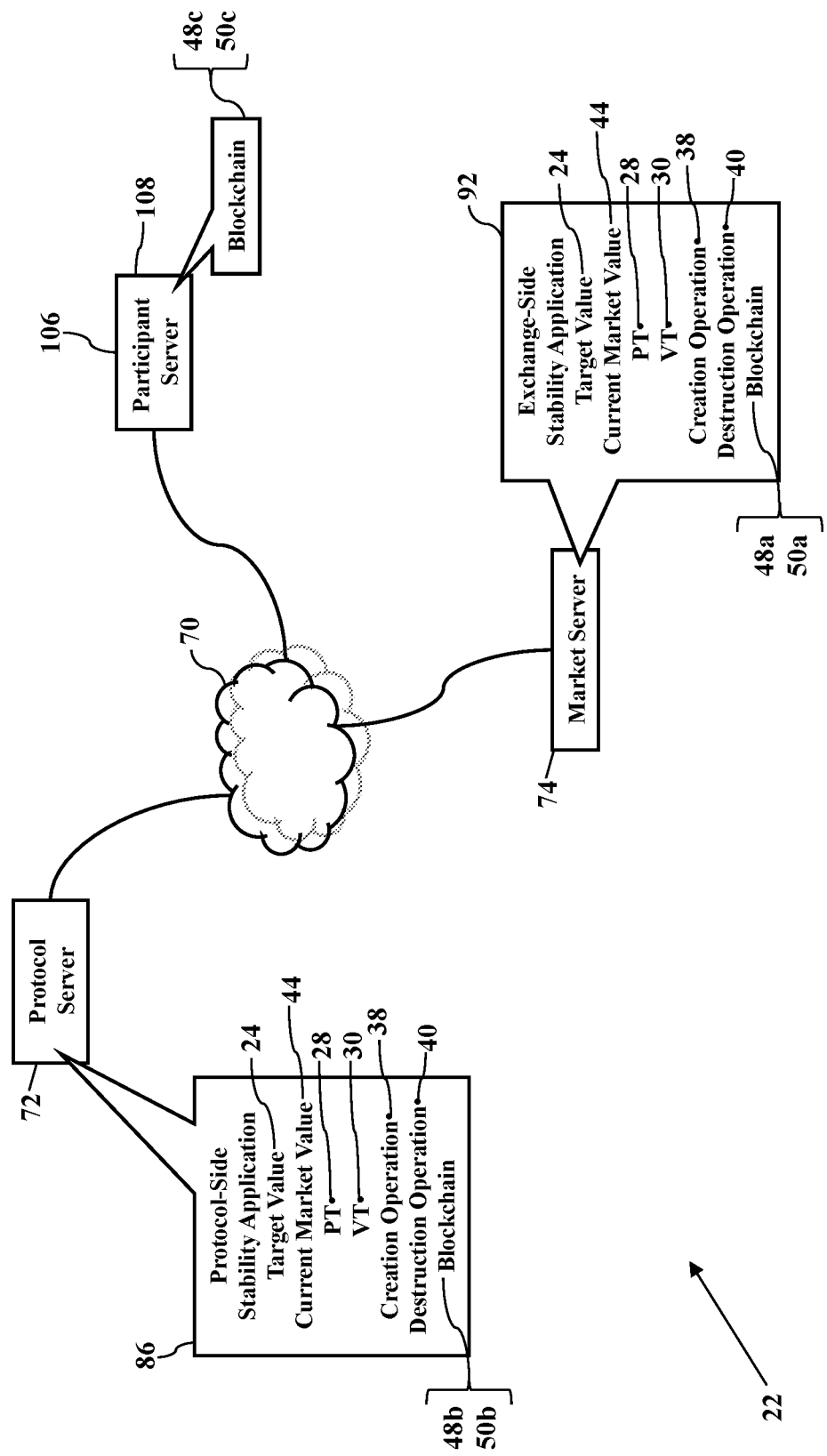
FIGS. 11-13 illustrate a below-target scenario, according to exemplary embodiments.
Figure 12:
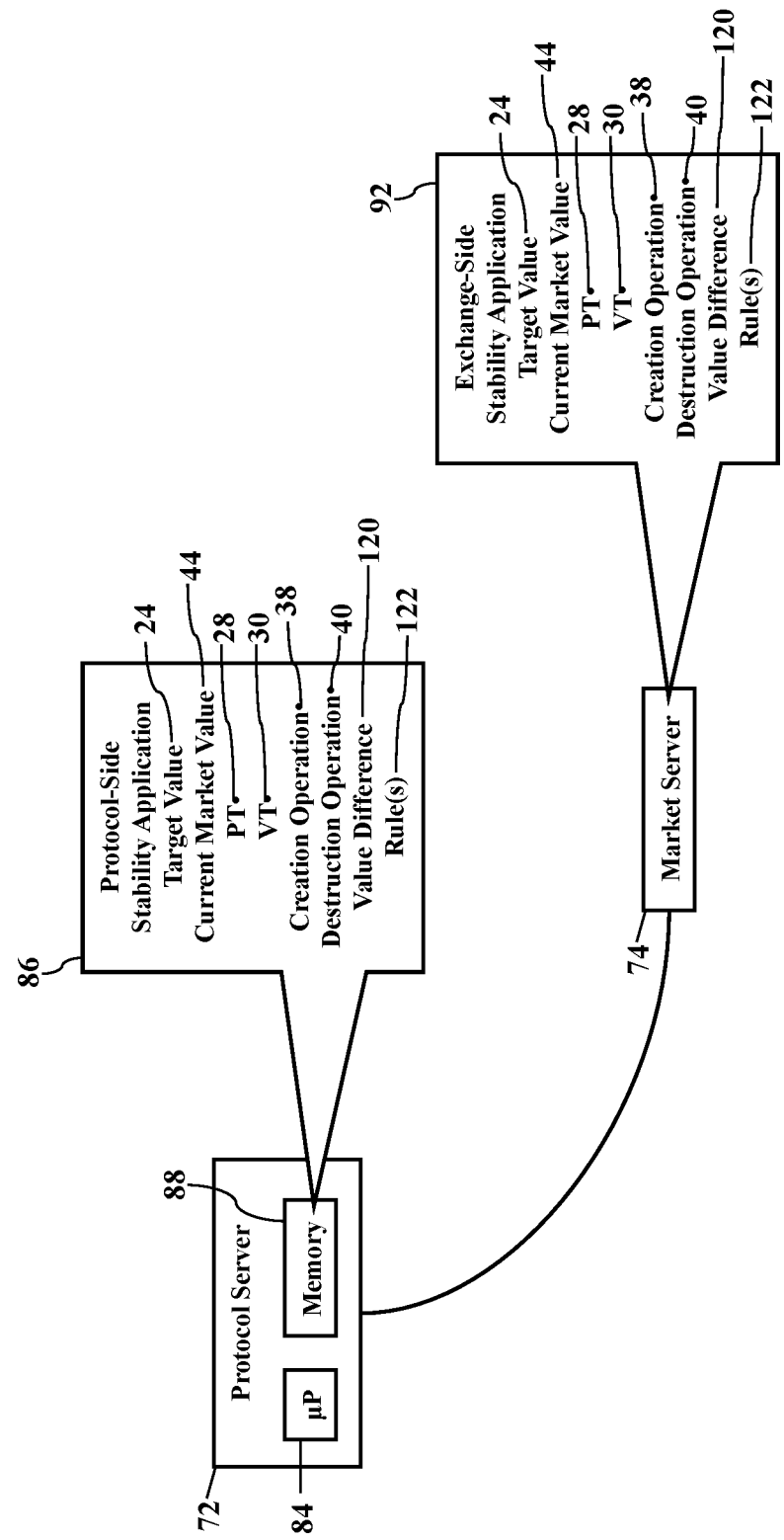
Figure 13:
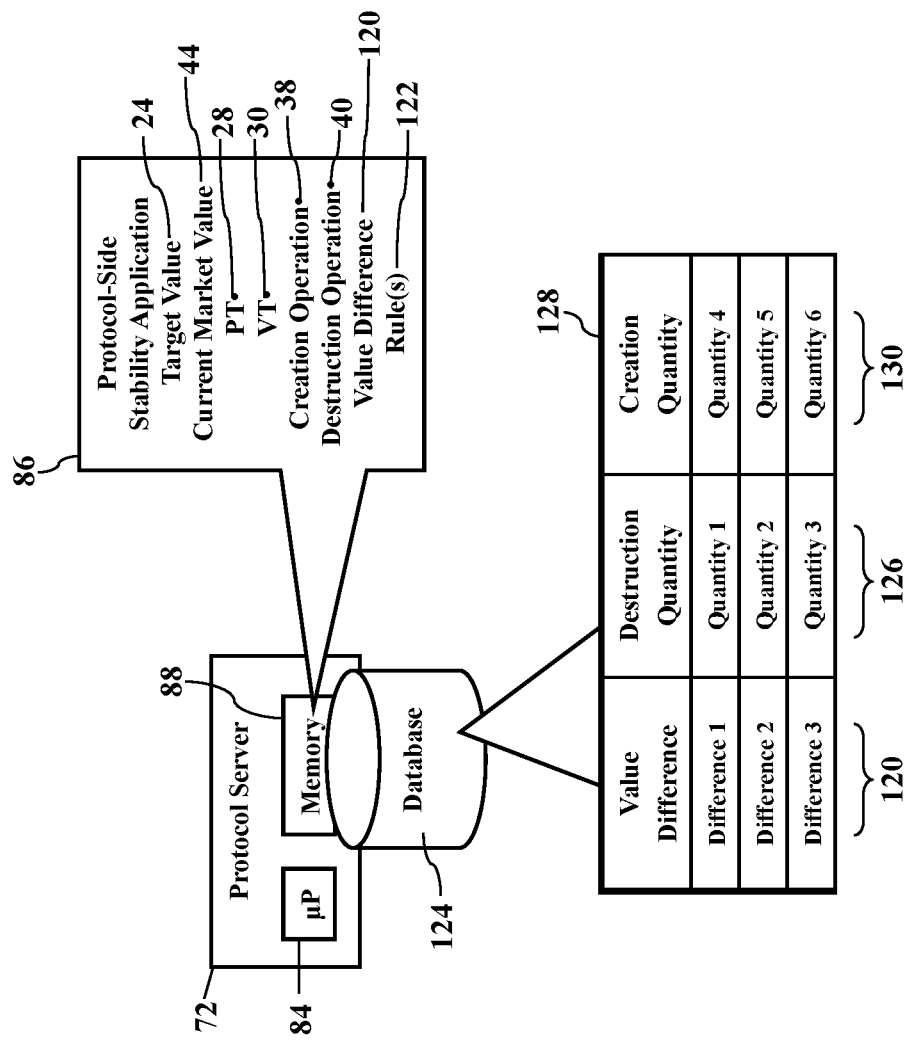

FIGS. 11-13 illustrate a below-target scenario, according to exemplary embodiments. Here the current market value 44 of the pegged cryptographic token 28 lags or trails its desired target value 24. Put another way, if the pegged cryptographic token 28 is trading low, then the demand 46 for the pegged cryptographic token 28 is falling and low and devalued relative to the variable-priced cryptographic token 30. The digital or smart contract 50a-c, whether processed by the market server 74, the protocol server 72, and/or the participant server 106, determines the buy opportunity in the pegged cryptographic token 28. Conversely, any smart contracts 50a-c executed on behalf of holders of the variable-priced cryptographic token 30 see the sell opportunity to reap a profit. The smart contracts 50 may thus organize or arrange to sell or exchange a quantity of the variable-priced cryptographic tokens 30 for an equivalent quantity of the pegged cryptographic tokens 28 (according to the cryptographic exchange rate 34), thus realizing the profit. The protocol server 72, perhaps acting in concert with the market server 74, may jointly operate as a powerful stabilizing force for the pegged cryptographic token 28.

Stabilization may occur. Because a profit opportunity exists, the smart contract 50 (perhaps executed by the blockchain 48) sells or exchanges the variable-priced cryptographic tokens 30 for an equivalent quantity or number of the pegged cryptographic tokens 28 (according to the cryptographic exchange rate 34), thus realizing the profit. As the sales/exchanges are processed, a total population, quantity, or pool of the variable-priced cryptographic tokens 30 in the market exchange 32 is reduced (perhaps due to the destruction operation 40) and the total population, quantity, or pool of the pegged cryptographic tokens 28 (e.g., a total number in usage or issuance) increases in the market exchange 32 (perhaps due to the creation operation 38). As the coinage exchanges proceed, the issuing authority 26 and/or the market exchange 32 may monitor the circulation numbers or supplies of the variable-priced cryptographic tokens 30, the pegged cryptographic tokens 28, their current market values 44, and the target value 24. If too many variable-priced cryptographic tokens 30 are sold or exchanged and destroyed, there may be a greater number of the pegged cryptographic tokens 28 than desired (due to the creation operation 38 and/or the destruction operation 40) and the oversupply condition may exist, perhaps causing values to fall. Simultaneously, or nearly simultaneously, the issuing authority 26 and/or the market exchange 32 may cooperate to reduce, or withdraw, the pegged cryptographic tokens 28 from the market exchange 32. The issuing authority 26, in other words, performs the destruction operation 40 to withdraw and destroy a desired quantity of the pegged cryptographic tokens 28 from the market exchange 32 to stabilize its current market value 44 to the target value 24. At nearly the same time, the issuing authority 26 performs the creation operation 38 to create a desired quantity of the variable-priced cryptographic tokens 30 and injects, or deposits, the newly-created variable-priced cryptographic tokens 30 into the market exchange 32, thus replenishing its population supply. These trades/exchanges may happen without delays imposed by deposits and withdraws as long as balances are setup ahead of time by the trader. Trades on the market exchange 32 and with the issuing authority 26 may be executed in parallel. Once the trades are executed and recorded (perhaps to the blockchain 48), the issuing authority 26 deposits or replenishes the population supply or balance of the variable-priced cryptographic tokens 30 into the market exchange 32 to set the market exchange 32 up for the next arbitrage opportunity.

Exemplary embodiments thus stabilize the pegged cryptographic token 28. Because the exchange of the pegged cryptographic token 28 for the variable-priced cryptographic token 30 could vary greatly over time, the issuing authority 26 ensures enough variable-priced cryptographic tokens 30 are injected/provided for any transaction. These variable-priced cryptographic tokens 30 are created and the pegged cryptographic tokens 28 are destroyed. Moreover, the issuing authority 26 may also create any amount of the variable-priced cryptographic tokens 30 that are needed to maintain an equilibrium between the current market value 44 and the target value 24 of the pegged cryptographic token 28.

Exemplary embodiments use market forces. If the pegged cryptographic token 28 is trading low, then traders/holders in the market exchange 32 consider the pegged cryptographic token 28 to be devalued relative to the variable-priced cryptographic token 30. The market exchange 32 may have a pool of the pegged cryptographic tokens 28 and another pool of the variable-priced cryptographic tokens 30. The issuing authority 26 (e.g., a protocol or central authority off the market exchange 32) also has additional pools of the pegged cryptographic tokens 28 and the variable-priced cryptographic tokens 30. When the pegged cryptographic token 28 is devalued by the market exchange 32, demand is low and traders/holders will have a profit incentive to buy the pegged cryptographic token 28 at its low current market price 44, thus converting the pegged cryptographic token 28 to its equivalent number of variable-priced cryptographic tokens 30 (according to the cryptographic exchange rate 34). Because the issuing authority 26 may monitor the total number of the variable-priced cryptographic tokens 30, the issuing authority 26 may also, nearly simultaneously, buy an excess number of the variable-priced cryptographic tokens 30 to maintain a consistent supply or pool of the variable-priced cryptographic tokens 30. Recall that a buy order destroys the variable-priced cryptographic tokens 30 and creates or gains more pegged cryptographic tokens 28. Simply put, anytime a trader/holder and/or the issuing authority 26 can make money, market forces will push the market price 44 up. An increasing market price 44 concomitantly increases the demand of the pegged cryptographic token 28, thus bringing the current market price 44 toward the target value 24.

As FIG. 12 illustrates, exemplary embodiments may implement algorithmic decentralized monetary policy. Assume, again, that the current market value 44 of the pegged cryptographic token 28 lags or trails its desired target value 24. The protocol-side stability application 86 instructs the protocol server 72 to compare the current market value 44 to its desired target value 24. When the current market value 44 (or "CMV") is less than the target value 24 (or "TV"), a value difference 120 is negative (e.g., [CMV-TV] <0). Because the demand 46 for the pegged cryptographic token 28 is falling or reducing, there may be too many of the pegged cryptographic tokens 28 in the market exchange 32 and the oversupply condition may exist. The protocol-side stability application 86 may thus instruct the protocol server 72 to implement pre-programmed fiscal measures to stabilize the current market value 44 of the pegged cryptographic token 28. For example, the protocol-side stability application 86 may identify and execute a logical rule 122 that forces a withdrawal of the pegged cryptographic tokens 28 from the market exchange 32. The logical rule 122 may thus be an algorithmic code or instruction that is executed in response to the negative value difference 120 and/or the oversupply condition. The protocol server 72 and the market server 74 may thus cooperate to withdraw and destroy a desired quantity of the pegged cryptographic tokens 28 from the market exchange 32 to stimulate the demand 46 and to increase its current market value 44 toward the target value 24.

As FIG. 13 illustrates, exemplary embodiments may query an electronic database 124. The electronic database 124 is illustrated as being locally stored and maintained by the protocol server 72, but any of the database entries may be stored by the market server 74 and/or at any remote, accessible location via the communication network 70 (illustrated by FIG. 7). Regardless, the electronic database 124 relates, maps, or associates different values of the value difference 120 to their corresponding destruction quantity 126. While the electronic database 124 may have any logical and physical structure, a relational structure is thought perhaps easiest to understand. FIG. 13 thus illustrates the electronic database 124 as a table 128 that relates, maps, or associates each value difference 120 to its corresponding destruction quantity 126. So, once the value difference 120 is determined, exemplary embodiments may query the electronic database 124 for the value difference 120 and identify its corresponding destruction quantity 126. While FIG. 13 only illustrates a simple example of a few entries, in practice the electronic database 124 may have many entries that detail a rich depository of different rules 122 and their finely defined destruction quantities 126. Once the destruction quantity 126 is determined, exemplary embodiments perform the destruction operation 40 to remove or delete the destruction quantity 126 of the pegged cryptographic tokens 28 from the market exchange 32.

The creation operation 38 may also be performed. Recall that exemplary embodiments may also monitor the total population, quantity, or pool of the variable-priced cryptographic tokens 30 in the market exchange 32. Once the value difference 120 is determined (as above explained), the same or a different rule 122 may also be implemented to create and to inject additional variable-priced cryptographic tokens 30 into the market exchange 32. That is, the electronic database 124 may additionally or alternatively have entries that associate the different value differences 120 to different creation quantities 130. Exemplary embodiments may thus query the electronic database 124 for the value difference 120 and identify its corresponding creation quantity 130. Once the creation quantity 130 is determined, exemplary embodiments perform the creation operation 38 to deposit or inject newly-created variable-priced cryptographic tokens 30 into the market exchange 32. Exemplary embodiments may implement these pre-programmed fiscal measures to stabilize the current market value 44 of the pegged cryptographic token 28.

Figure 14:
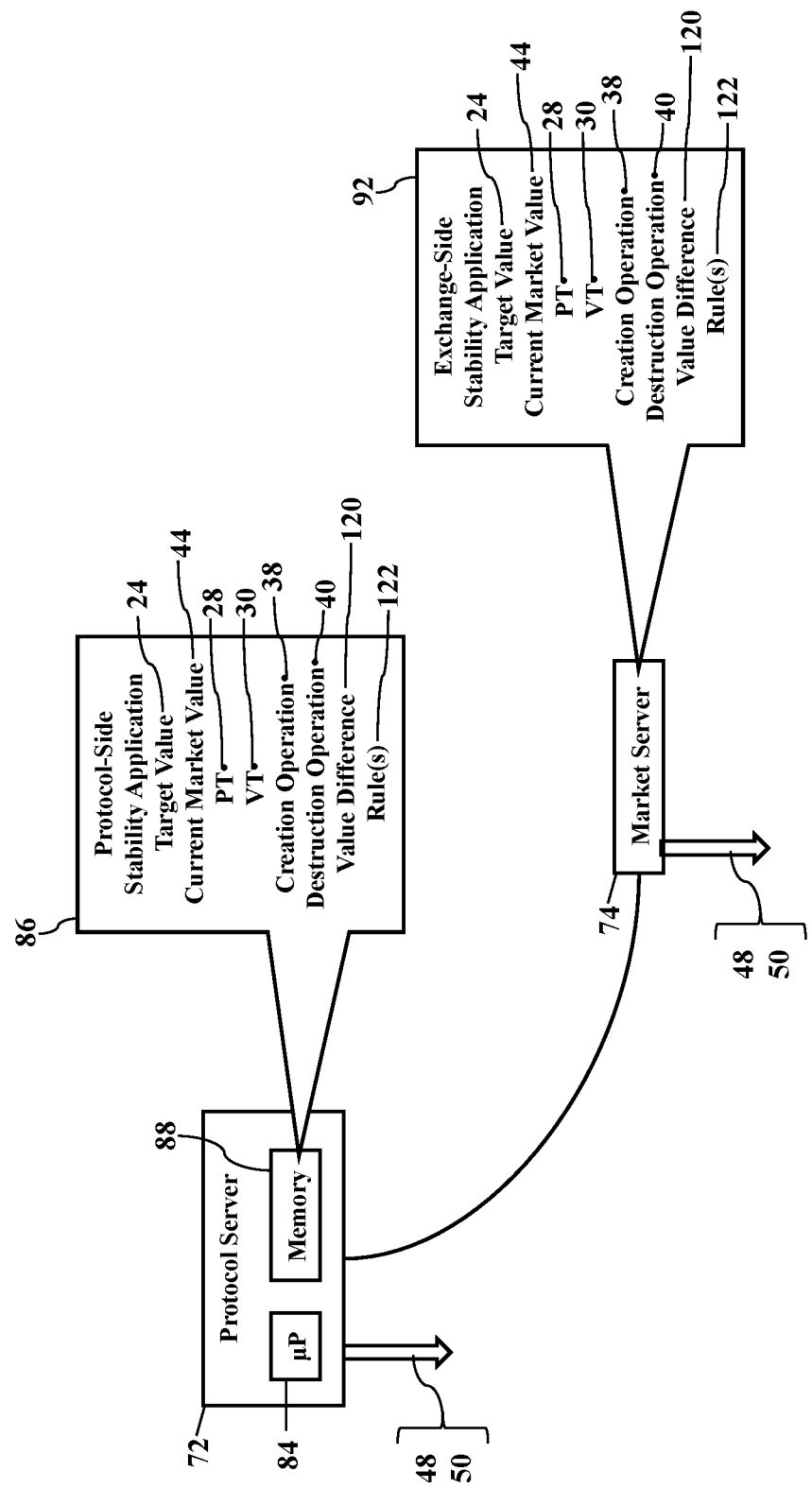
FIGS. 14-15 illustrate an above-target scenario, according to exemplary embodiments.
Figure 15:
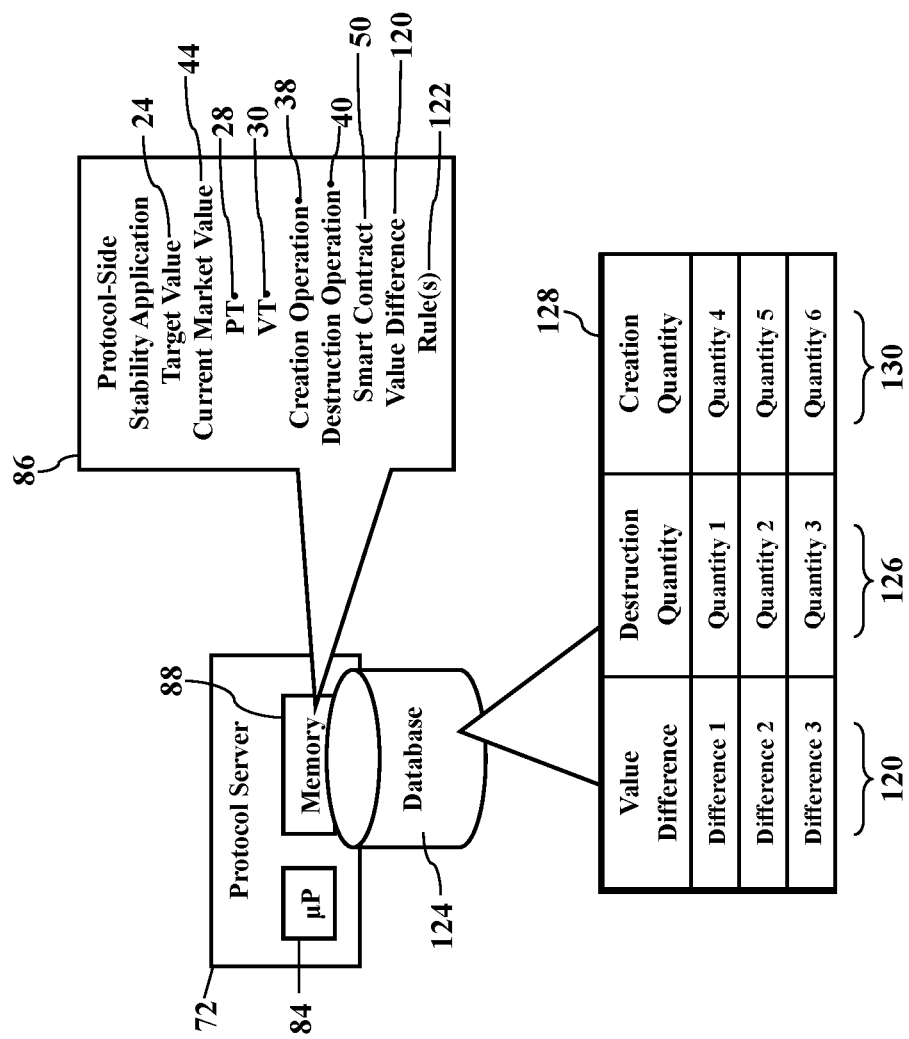

FIGS. 14-15 illustrate an above-target scenario, according to exemplary embodiments. Here the current market value 44 of the pegged cryptographic token 28 is greater or higher than its desired target value 24. Demand for the pegged cryptographic token 28 is increasing, so the pegged cryptographic token 28 may eventually be overvalued relative to the variable-priced cryptographic token 30 and/or to its target price or value 24. The smart contract 50 may thus determine the sell opportunity to reap a profit, while other smart contracts/traders/holders see the buy opportunity in the variable-priced cryptographic token 30. The smart contract 50 may sell or exchange the pegged cryptographic tokens 28 for an equivalent number of the variable-priced cryptographic tokens 30 (according to the cryptographic exchange rate 34), thus realizing the profit. As the sales/exchanges are processed, the demand 46 for the pegged cryptographic token 28 decreases, thus reducing its current market value 44 toward its target value 24. Moreover, the demand 46 for the variable-priced cryptographic token 30 increases, thus increasing its current market value 44.

Population control may also be implemented. As the holders of the pegged cryptographic token 28 sell, the population pool or quantity of the pegged cryptographic tokens 28 in the market exchange 32 decreases. As the coinage trades proceed, the issuing authority 26 and/or the market exchange 32 may monitor the population supplies of the variable-priced cryptographic tokens 30, the pegged cryptographic tokens 28, their current market values 44, and the target value 24. If too many pegged cryptographic tokens 28 are sold or exchanged and destroyed, there may be a greater number of the variable-priced cryptographic tokens 30 than desired (due to the creation operation 38 and/or the destruction operation 40) and the oversupply condition may exist. Simultaneously, or nearly simultaneously, the issuing authority 26 and/or the market exchange 32 may cooperate to reduce, or withdraw, the variable-priced cryptographic tokens 30 from the market exchange 32. The issuing authority 26, in other words, performs the destruction operation 40 to destroy a desired quantity of the variable-priced cryptographic tokens 30 from the market exchange 32 to stabilize its current market value 44 to the target value 24. At nearly the same time, the issuing authority 26 performs the creation operation 38 to create a desired quantity of the pegged cryptographic tokens 28 and injects, or deposits, the newly-created pegged cryptographic tokens 28 into the market exchange 32, thus replenishing its population supply. These trades may then be recorded to the blockchain 48.

Market forces again prevail. If the value of the pegged cryptographic token 28 is high compared to its target value 24 and/or the variable-priced cryptographic token 30, then the pegged cryptographic token 28 may be sold on the market exchange 32 for the variable-priced cryptographic token 30. This sell operation results in a greater amount of the variable-priced cryptographic tokens 30 than the pegged cryptographic token 28 should allow. At the same time, a lesser amount of the variable-priced cryptographic tokens 30 can be exchanged for the same pegged cryptographic tokens 28 by the issuing authority 26, thus replenishing the supply of the pegged cryptographic tokens 28 in the market exchange 32.

As FIG. 15 illustrates, more algorithmic currency control may be implemented. Because the current market value 44 of the pegged cryptographic token 28 exceeds its desired target value 24, the demand 46 for the pegged cryptographic token 28 is increasing and may become overvalued. The protocol-side stability application 86 instructs the protocol server 72 to compare the current market value 44 to its desired target value 24. The value difference 120 is positive (e.g., [CMV-TV]>0) and the oversupply condition may exist. Exemplary embodiments may implement additional pre-programmed fiscal measures, such as executing one of the logical rules 122 to force a reduction or withdrawal of the variable-priced cryptographic token(s) 30 from the market exchange 32. Once the value difference 120 is determined, exemplary embodiments may query the electronic database 124 for the value difference 120 and identify its corresponding destruction quantity 126 and/or its corresponding creation quantity 130. The protocol server 72 and the market server 74 may thus cooperate to withdraw and destroy the destruction quantity 126 of the variable-priced cryptographic tokens 30. Additionally or alternative, exemplary embodiments may perform the creation operation 38 and deposit the creation quantity 130 of newly-created pegged cryptographic token 28 into the market exchange 32. Exemplary embodiments may implement these pre-programmed fiscal measures to stabilize the current market values 44 of the pegged cryptographic token 28 and/or the variable-priced cryptographic token 30.

As FIGS. 11-15 illustrate, the issuing authority 26 may thus be one of the market participants 106. However, the issuing authority 26 may participate for opposite market effects. When the issuing authority 26 trades between the pegged cryptographic tokens 28 and the variable-priced cryptographic tokens 30, the market effect of these trades is opposite to the trades on the market exchange 32. Suppose, for example, that a large number of the variable-priced cryptographic tokens 30 were sold for between the pegged cryptographic tokens 28 on the market exchange 32. The price of the variable-priced cryptographic token 30 necessarily goes down as the trade(s) consumes the order book for the variable-priced cryptographic token 30. On the other hand, a large number of the variable-priced cryptographic tokens 30 exchanged for the pegged cryptographic tokens 28 using the issuing authority 26 reduces the supply of the variable-priced cryptographic tokens 30 by that amount. Lowering the supply of the variable-priced cryptographic tokens 30 eventually increases the current market price 44 of the variable-priced cryptographic tokens 30. So, as the pegged cryptographic token 28 becomes popular as a stable value, the demand for the pegged cryptographic token 28 is likely to rise, but the only way to create a bigger supply of the pegged cryptographic token 28 is through the conversation of the variable-priced cryptographic token 30 to the pegged cryptographic token 28, which lowers the supply of the variable-priced cryptographic token 30. On the other hand, if the value of the variable-priced cryptographic token 30 is in question and falls in the market exchange 32, conversion to the pegged cryptographic token 28 becomes attractive. All of these operations (e.g., the creation operation 38 and the destruction operation 40) increase the value of the variable-priced cryptographic token 30. As the value of the variable-priced cryptographic token 30 goes up, market participants will purchase the variable-priced cryptographic token 30 and thus further increase its value. But demand may also trigger the conversion of the pegged cryptographic token 28 to the variable-priced cryptographic token 30, and that conversion may dampen the growth in value of the variable-priced cryptographic token 30 by increasing the supply.

Figure 16:
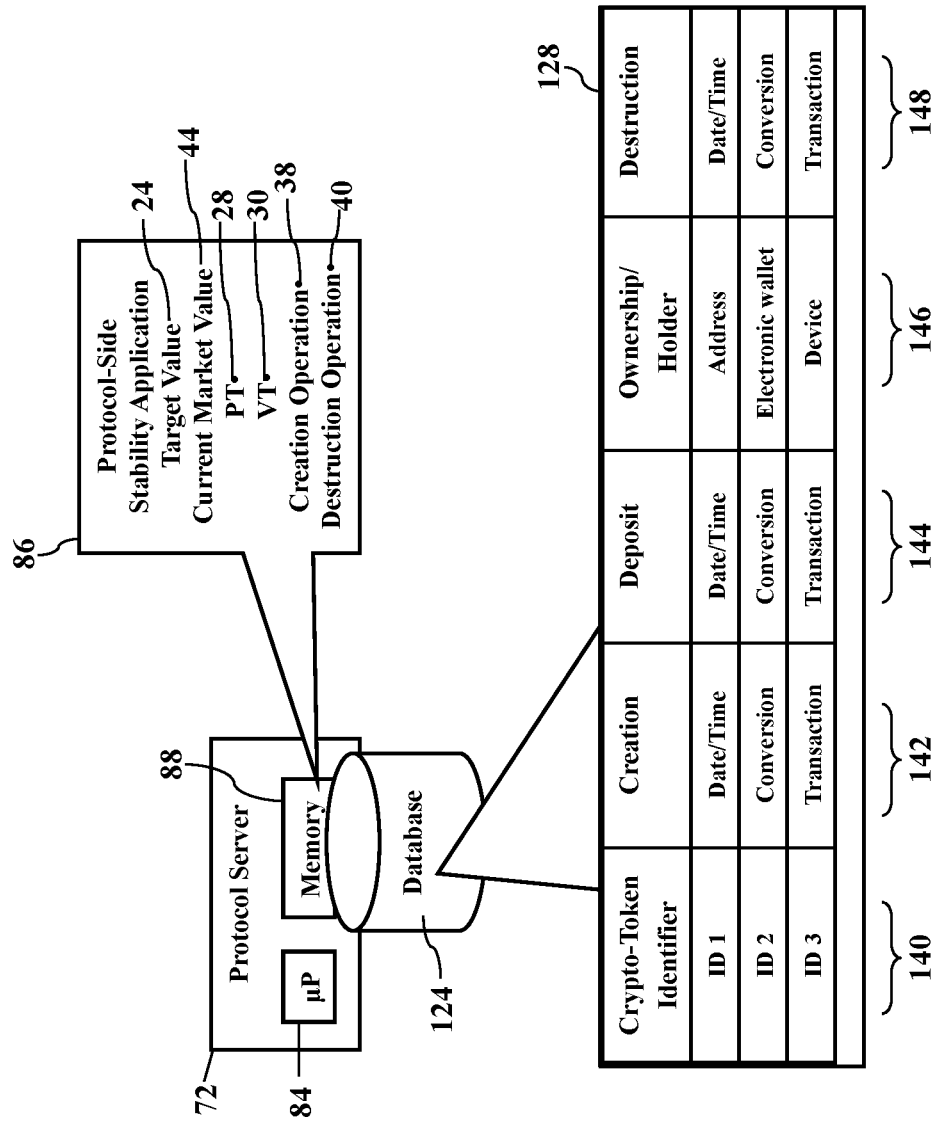
FIG. 16 illustrates indexing of cryptographic coinage, according to exemplary embodiments.

FIG. 16 illustrates indexing of cryptographic coinage, according to exemplary embodiments. When any cryptographic token 28 and 30 is created or destroyed (perhaps initially or via the creation operation 38 and/or the destruction operation 40, as above explained), here exemplary embodiments may then log the details. As a simple example, suppose the protocol server 72 logs each creation operation 38 and each destruction operation 40 in the electronic database 124. The electronic database 124 may thus store and maintain detailed transactional records for each pegged cryptographic token 28 and/or for each variable-priced cryptographic token 30. Suppose, for example, that each pegged cryptographic token 28 and each variable-priced cryptographic token 30 is uniquely identified with a unique token identifier 140. Moreover, the electronic database 124 has entries that relate, associate, or map each token identifier 140, its creation details 142, its deposit details 144 of entry or injection into the market exchange 32, and its ownership details 146 (such as buyer/seller account addresses, holder information, and/or electronic wallet details). Moreover, if the cryptographic token 28 or 30 was subject to the destruction operation 40, then the electronic database 124 may logs its corresponding destruction details 148 documenting its withdrawal from the market exchange 32. Although not shown, the entries may further relate each cryptographic token 28 or 30 to its corresponding pricing information 82 and the smart contract 50 and/or the market server 74 that ordered or requested the buy/sell/conversion. Exemplary embodiments may thus generate a central repository that indexes each cryptographic token 28 or 30 that is created and/or deposited into the market exchange 32. The entries may further relate each cryptographic token 28 or 30 that was destroyed after creation (according to the creation operation 38). The entries may thus fully document what tokens 28 or 30 were created, how and when and why, and also their destruction, if any.

The electronic database 124 may be queried for its entries. Because the electronic database 124 may store detailed creation and destruction records for each pegged cryptographic token 28 and each variable-priced cryptographic token 30, any client may send a query to the protocol server 72 to identify related entries. As an example, a query parameter may specify the unique token identifier 140 and request its corresponding entries (such as its date/time of creation and current ownership/holder details). A query response is sent back to the client, and the query response specifies any of the corresponding database entries.

Figure 17:
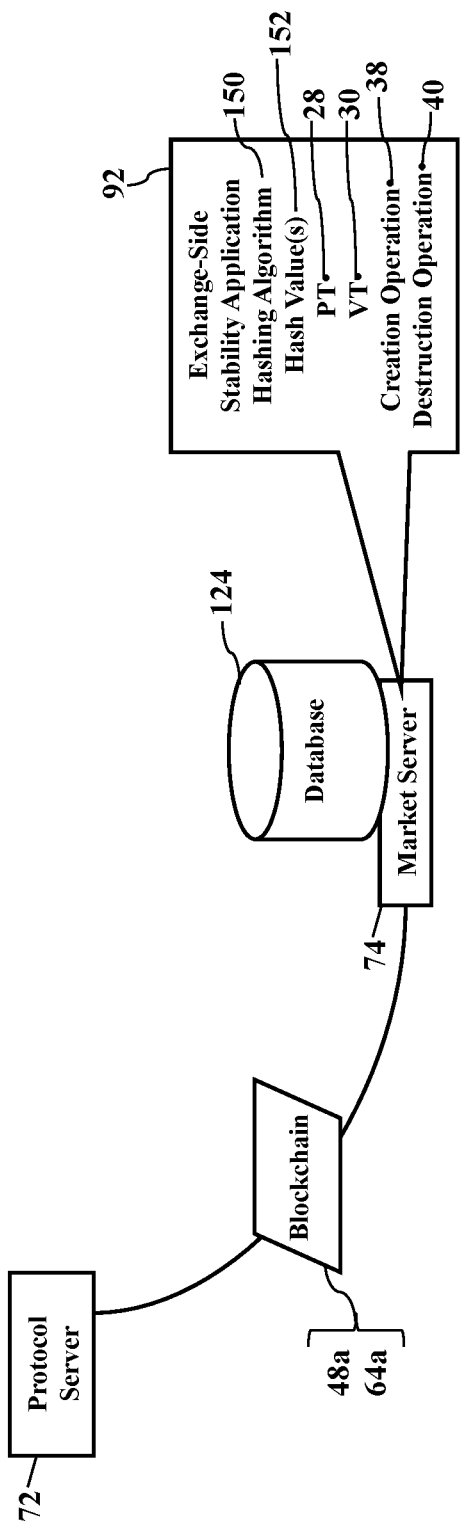
FIGS. 17-18 illustrate blockchain recordations, according to exemplary embodiments.
Figure 18:
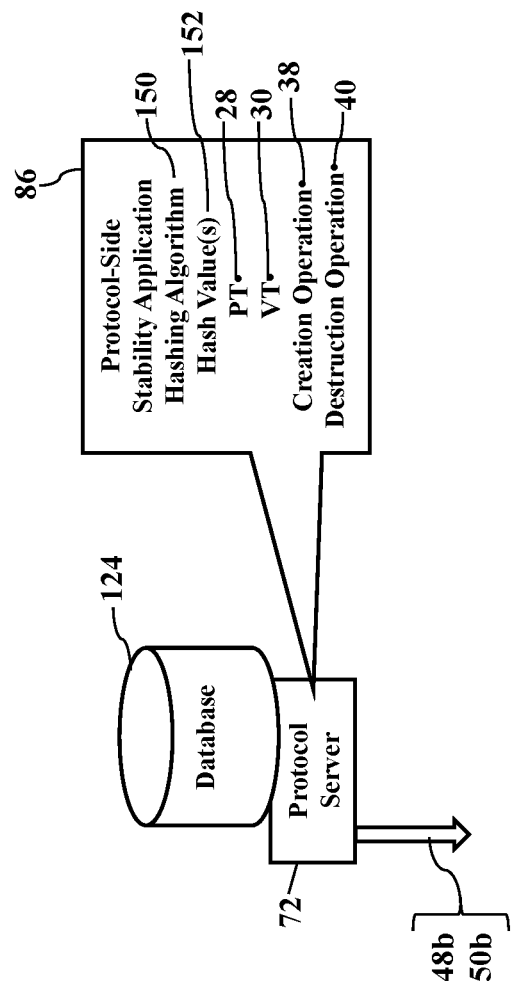

FIGS. 17-18 illustrate blockchain recordations, according to exemplary embodiments. Here, when any pegged cryptographic token 28 or any variable-priced cryptographic token 30 is created or destroyed, exemplary embodiments may record that creation operation 38 and/or destruction operation 40 to the blockchain 48. The market server 74, for example, may generate the block 64a of data within the blockchain 48a. The exchange-side stability application 92 may even call, invoke, and/or apply an electronic representation of a hashing algorithm 150 to any of the entries in the electronic database 124 and/or to the block 64 of data within the blockchain 48a. The hashing algorithm 150 thus generates one or more hash values 152, which may be incorporated into the blockchain 48a. The exchange-side stability application 92 may then instruct the market server 74 to send the blockchain 48a to any destination, such as the network address (e.g., Internet protocol address) associated with the protocol server 72.

FIG. 18 also illustrates blockchain records. When any pegged cryptographic token 28 or any variable-priced cryptographic token 30 is created or destroyed, that creation operation 38 and/or destruction operation 40 may be recorded to the blockchain 48b. The protocol server 72, for example, may generate the block 64b of data within the blockchain 48b. The protocol-side stability application 86 may also call, invoke, and/or apply an electronic representation of the hashing algorithm 150 to any of the entries in the electronic database 124 and/or to the block 64b of data within the blockchain 48b. The hashing algorithm 150 thus generates one or more hash values 152, which are incorporated into the blockchain 48b.

Figure 19:
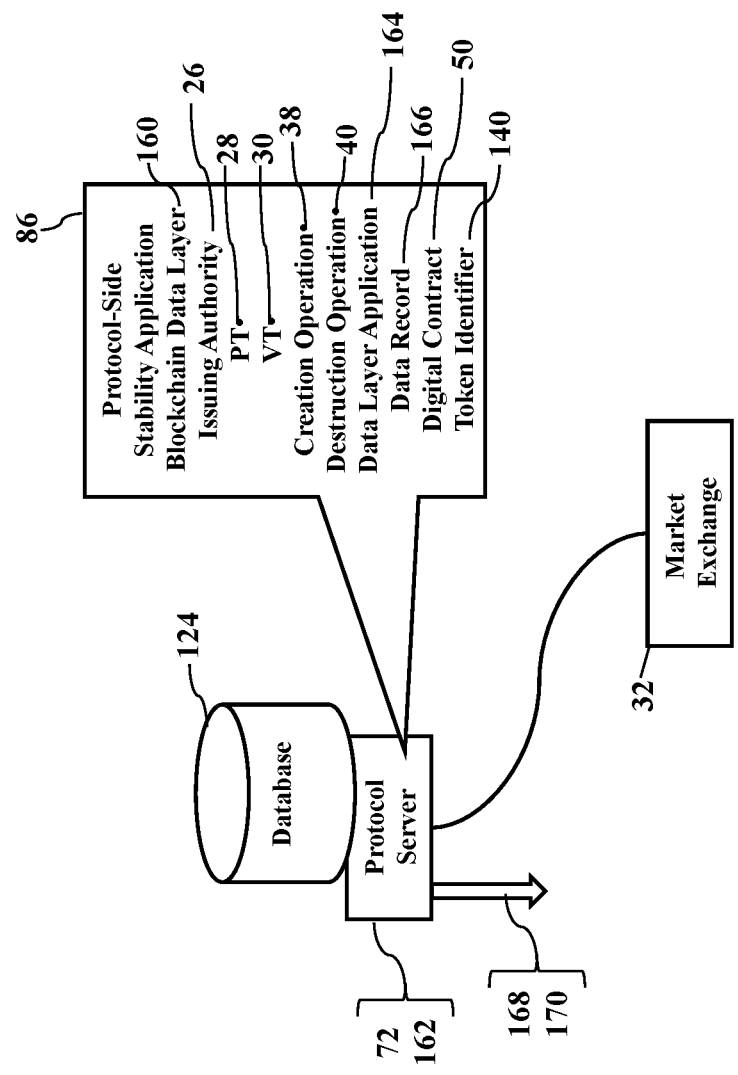
FIGS. 19-20 illustrate a blockchain data layer, according to exemplary embodiments.
Figure 20:
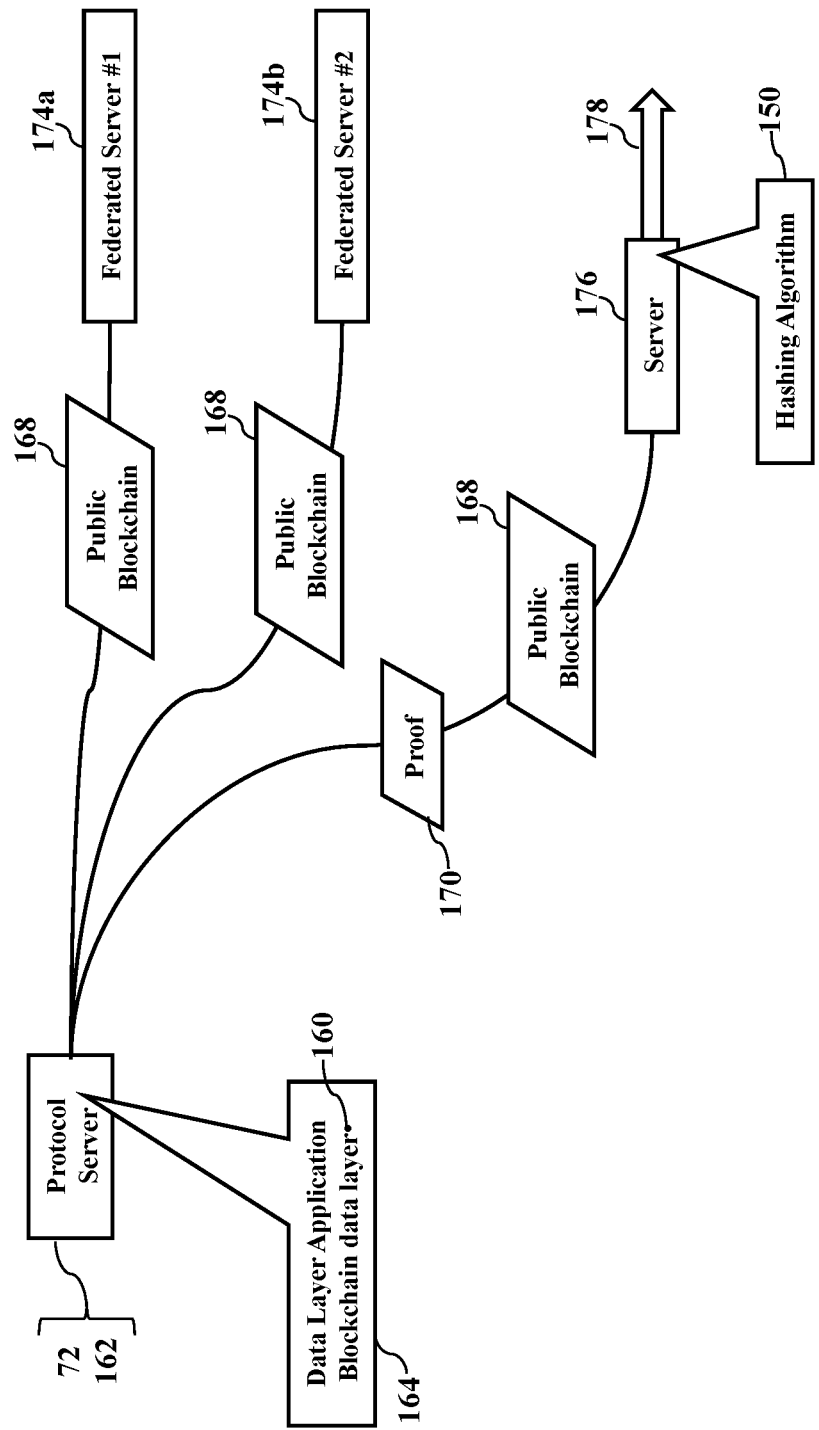

FIGS. 19-20 illustrate a blockchain data layer 160, according to exemplary embodiments. Here the protocol server 72 may generate a blockchain data layer 160 that also documents the creation operation 38 and the destruction operation 40 involving or associated with any pegged cryptographic token 28 or any variable-priced cryptographic token 30. Recall that the protocol server 72 is operated by or on behalf of the issuing authority 26 that manages the population supply of the pegged cryptographic tokens 28 and the variable-priced cryptographic tokens 30. When any token 28 or 30 is created or destroyed, whether within the market exchange 32 or by the issuing authority 26, the corresponding creation operation 38 and the destruction operation 40 may be documented within the blockchain data layer 160. The protocol server 72 may thus be termed or called a data layer server 162 that generates the blockchain data layer 160. The protocol-side stability application 86 may thus call, invoke, or apply a data layer application 164 as a software module or subroutine that generates data records 166 in the blockchain data layer 160. Moreover, the blockchain data layer 160 may also add another layer of cryptographic hashing to generate a public blockchain 168. The blockchain data layer 160 acts as a validation service that validates the smart, digital contract 50 was executed according to the creation operation 38 and the destruction operation 40. Moreover, the blockchain data layer 160 may generate a cryptographic proof 170. The public blockchain 168 thus publishes the cryptographic proof 170 as a public ledger that establishes chains of blocks of immutable evidence.

The blockchain data layer 160 may be searched. Because blockchain data layer 160 may track and/or prove any creation operation 38 and/or any destruction operation 40, exemplary embodiments may search the blockchain data layer 160 for any query parameter. For example, the protocol server 72 may receive queries from clients requesting the data records 166 within the blockchain data layer 160 that match a query parameter. As a simple example, suppose a query specifies the token identifier 140 as a query parameter. Recall that the token identifier 140 uniquely identifies its corresponding pegged cryptographic token 28 or variable-priced cryptographic token 30. The protocol server 72 may then act as a query handler, determine a matching data record 166 or other entry in the blockchain data layer 160, and identify/retrieve its corresponding contents or data or entries. As another example, suppose a query specifies some parameter or party associated with the smart contract 50 (such as a contract identifier that uniquely represents the smart contract 50). The protocol server 72 may then identify/retrieve any data records 166 associated with the smart contract 50, such as the specific pegged cryptographic token(s) 28 and the variable-priced cryptographic token(s) 30 that were created/destroyed according to the smart contract 50.

FIG. 20 illustrates additional publication mechanisms. Once the blockchain data layer 160 is generated, the blockchain data layer 160 may be published in a decentralized manner to any destination. The protocol server 72 (e.g., the data layer server 162), for example, may generate and distribute the public blockchain 168 (via the communications network 70 illustrated in FIGS. 7-8) to one or more federated servers 174. While there may be many federated servers 174, for simplicity FIG. 20 only illustrates two (2) federated servers 174a and 174b. The federated server 174a and 174b provide a service and, in return, they are compensated according to a compensation or services agreement or scheme.

Exemplary embodiments include still more publication mechanisms. For example, the cryptographic proof 170 and/or the public blockchain 168 may be sent (via the communications network 70 illustrated in FIGS. 7-8) to still another server 176. The server 176 may then add another, third layer of cryptographic hashing (perhaps using the hashing algorithm 150) and generate another or second public blockchain 178. While the server 176 and/or the public blockchain 178 may be operated by, or generated for, any entity, exemplary embodiments may integrate another cryptographic coin mechanism. That is, the server 176 and/or the public blockchain 178 may be associated with BITCOIN®, ETHEREUM®, RIPPLE®, or other cryptographic coin mechanism. The cryptographic proof 170 and/or the public blockchains 168 and 178 may be publicly distributed and/or documented as evidentiary validation. The cryptographic proof 170 and/or the public blockchains 168 and 178 may thus be historically and publicly anchored for public inspection and review.

Figure 21:
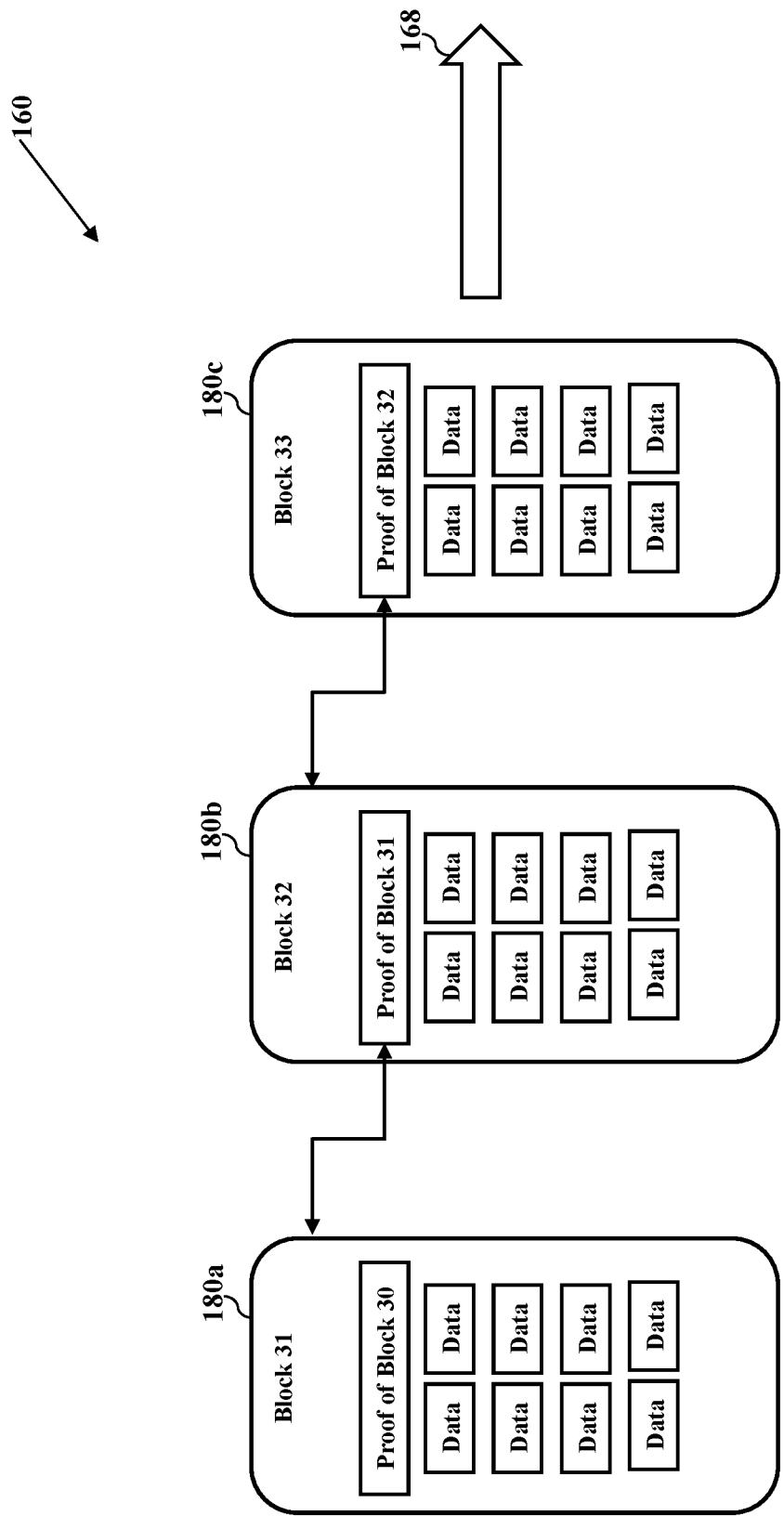
FIGS. 21-25 further illustrate the blockchain data layer, according to exemplary embodiments

FIGS. 21-25 further illustrate the blockchain data layer 160, according to exemplary embodiments. The blockchain data layer 160 chains hashed directory blocks 180 of data into the public blockchain 168. For example, the blockchain data layer 160 accepts input data (such as any of the data logged in the electronic database 124, and/or the blockchain 48a sent from the market server 74 illustrated in FIG. 17) within a window of time. While the window of time may be configurable from fractions of seconds to hours, exemplary embodiments use ten (10) minute intervals. FIG. 21 illustrates a simple example of only three (3) directory blocks 180a-c of data, but in practice there may be millions or billions of different blocks. Each directory block 180 of data is linked to the preceding blocks in front and the following or trailing blocks behind. The links are created by hashing all the data within a single directory block 180 and then publishing that hash value within the next directory block.

Figure 22:
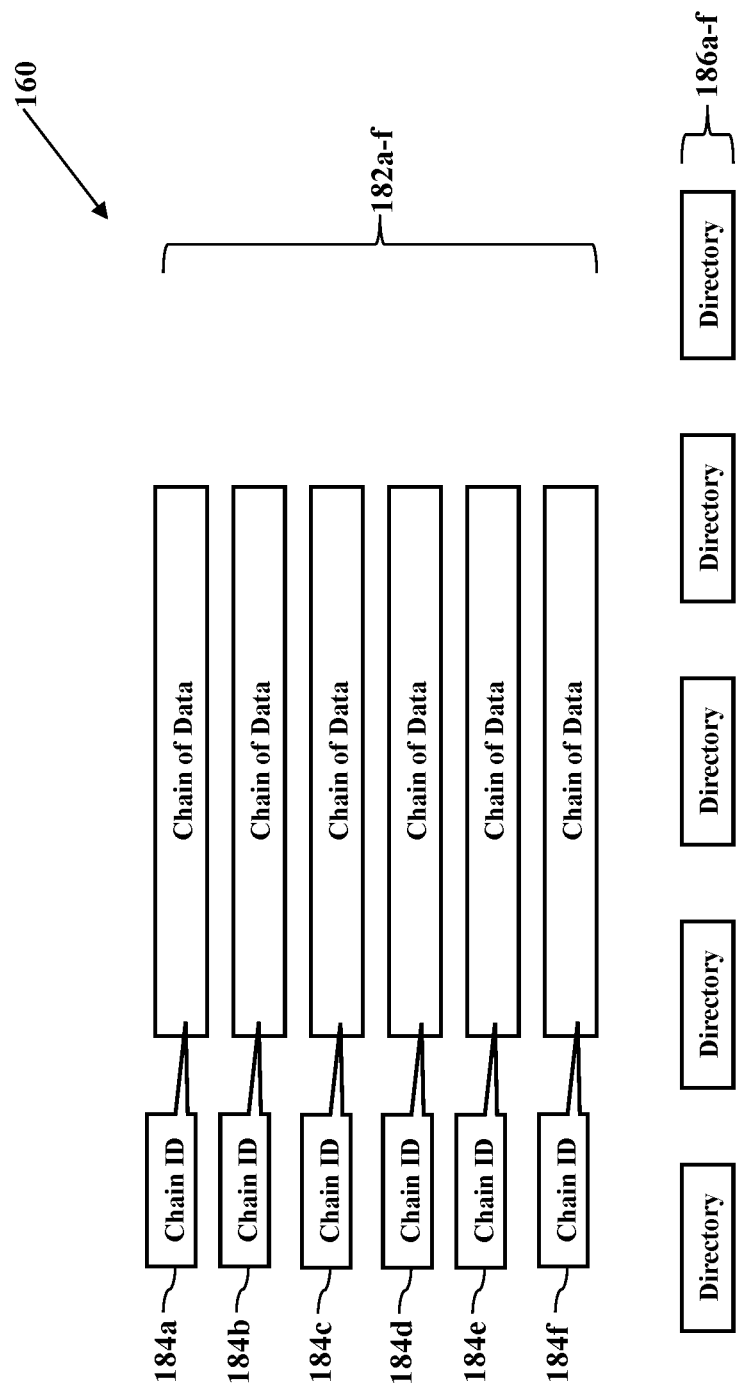

As FIG. 22 illustrates, published data may be organized within chains 182. Each chain 182 is created with an entry that associates a corresponding chain identifier 184. As a simple example, suppose there are several market participants 108 (such as different participant servers 106, illustrated with reference to FIG. 9), and each participant server 106 has its own corresponding chain identifier 184a-d. The blockchain data layer 160 may thus track any buy/sell/conversion and any other data associated with each participant server 106 with its corresponding chain identifier 184a-d. As other examples, each pegged cryptographic token 28 and each variable-priced cryptographic token 30 may also have its corresponding token identifier 140 and its corresponding chain identifier 184. A unique chain 182 may thus be used to track the buy/sell/creation/destruction events for any token 28 and 30. New and old data in time may be associated with, linked to, identified by, and/or retrieved using the chain identifier 184a-d. Each chain identifier 184a-d thus functionally resembles a directory 186a-d (e.g., files and folders) for organized data entries.

Figure 23:
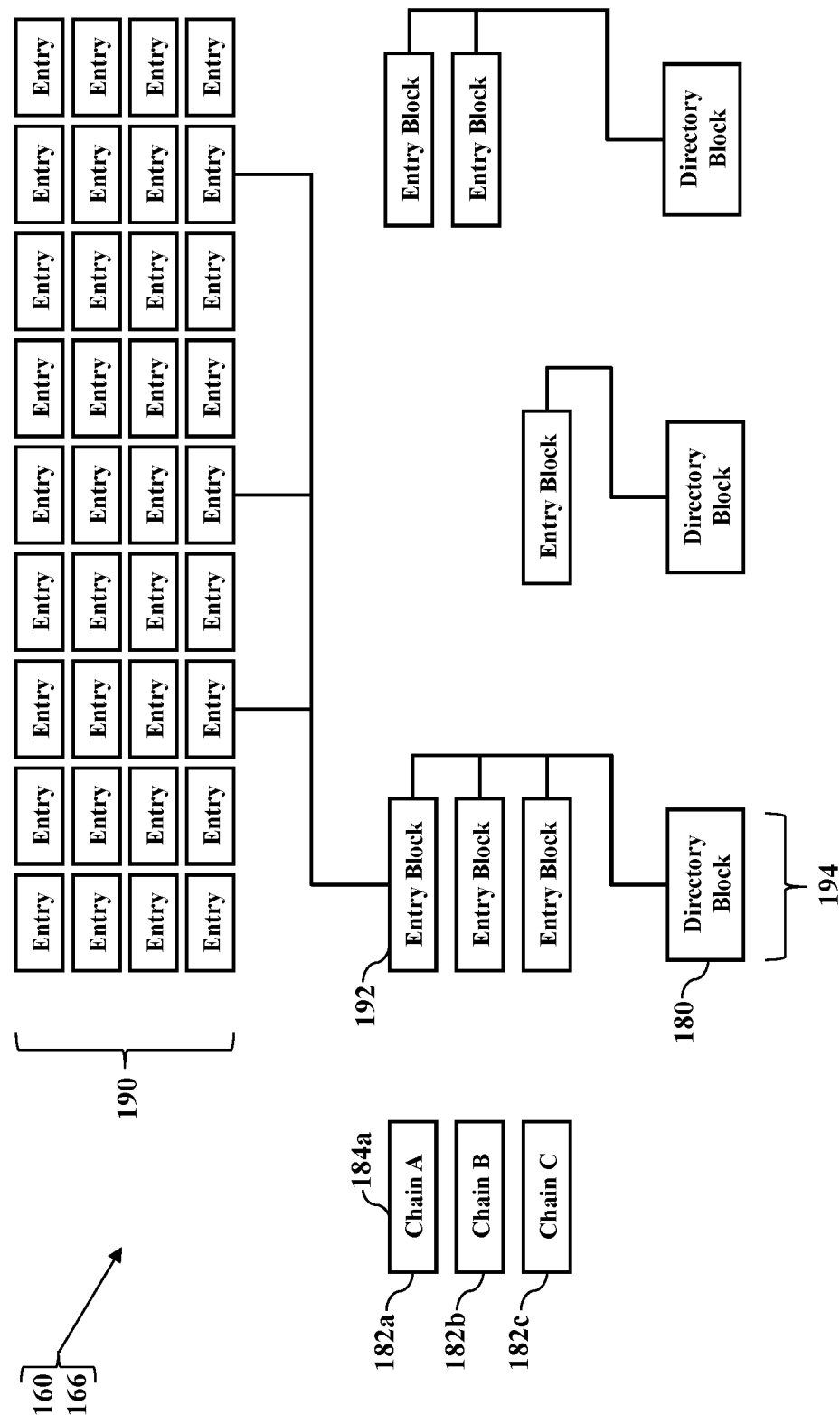

FIG. 23 illustrates the data records 166 in the blockchain data layer 160. As data is received as an input (such as the blockchain 48 and/or the order notification 110 illustrated in FIGS. 10-11), data is recorded within the blockchain data layer 160 as an entry 190. While the data may have any size, small chunks (such as 10 KB) may be pieced together to create larger file sizes. One or more of the entries 190 may be arranged into entry blocks 192 representing each chain 182 according to the corresponding chain identifier 184. New entries for each chain 182 are added to their respective entry block 192 (again perhaps according to the corresponding chain identifier 184). After the entries 190 have been made within the proper entry blocks 192, all the entry blocks 192 are then placed within in the directory block 180 generated within or occurring within a window 194 of time. While the window 194 of time may be chosen within any range from seconds to hours, exemplary embodiments may use ten (10) minute intervals. That is, all the entry blocks 192 generated every ten minutes are placed within in the directory block 180.

Figure 24:
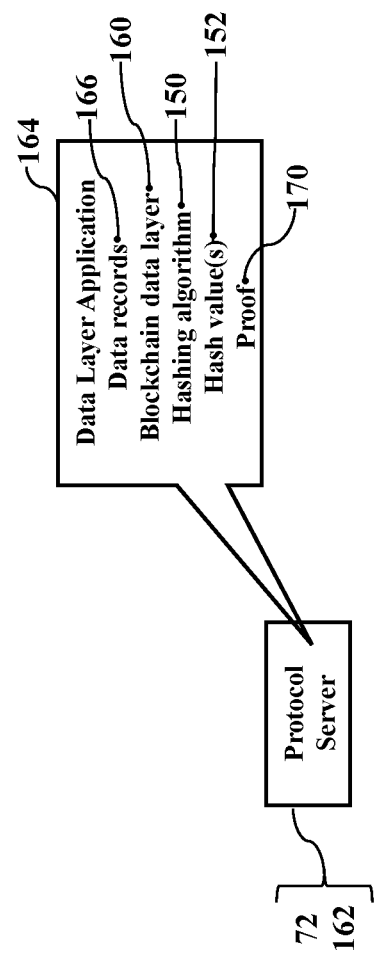

FIG. 24 illustrates cryptographic hashing. The protocol server 72 executes the data layer application 164 to generate the data records 166 in the blockchain data layer 160. The data layer application 164 may then instruct the data layer server 162 to execute the hashing algorithm 150 on the data records 166 (such as the directory block 180 illustrated in FIGS. 21-23). The hashing algorithm 150 thus generates one or more hash values 152 as a result, and the hash values 152 represent the hashed data records 166. As one example, the blockchain data layer 160 may apply a Merkle tree analysis to generate a Merkle root (representing a Merkle proof 170) representing each directory block 180. The blockchain data layer 160 may then publish the Merkle proof 170 (as this disclosure explains).

Figure 25:
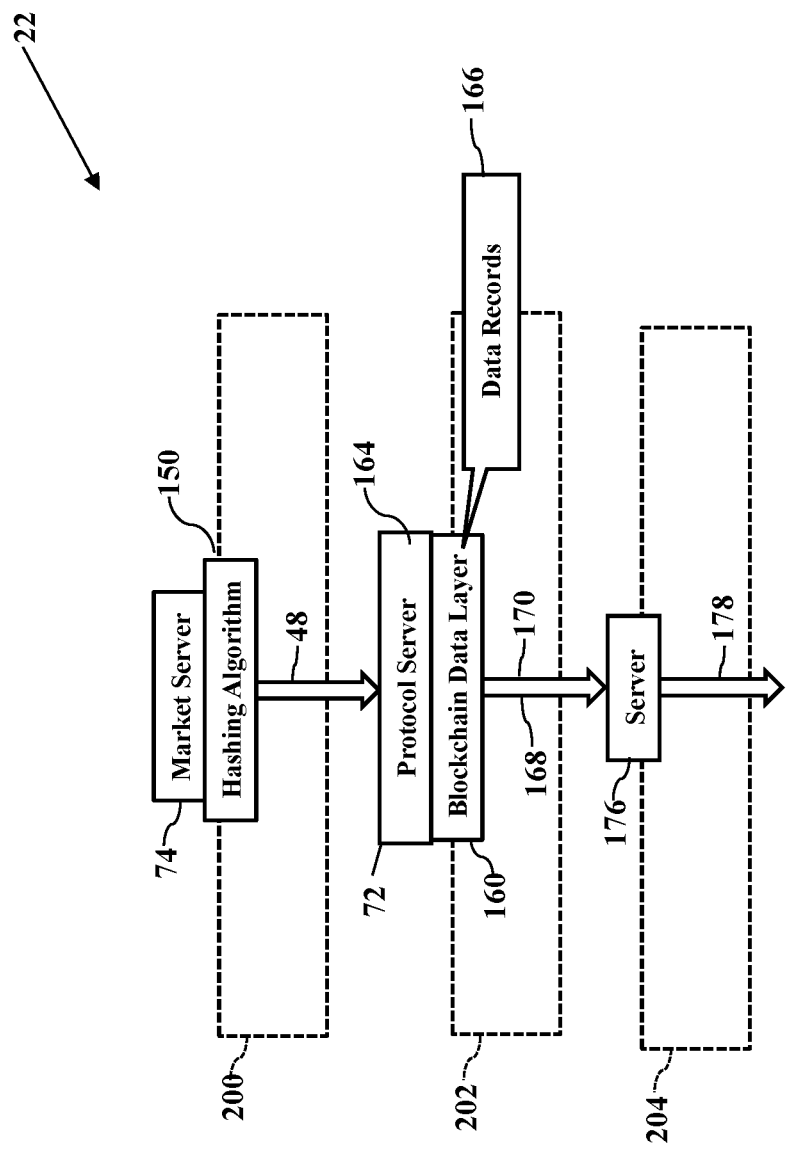

FIG. 25 illustrates hierarchical hashing. The market server 74, generating the blockchain 48, provides a first layer 200 of cryptographic hashing. The market server 74 may then send the blockchain 48 to the protocol server 72. The protocol server 72, executing the data layer application 164, generates the blockchain data layer 160. The data layer application 164 may optionally provide the second or intermediate layer 202 of cryptographic hashing to generate the cryptographic proof 170. The data layer application 164 may also publish any of the data records 166 as the public blockchain 168, and the cryptographic proof 170 may or may not also be published via the public blockchain 168. The public blockchain 168 and/or the cryptographic proof 170 may be optionally sent to a server 176 as an input to yet another public blockchain 178 (again, such as BITCOIN®, ETHEREUM®, or RIPPLE®) for a third layer 204 of cryptographic hashing and public publication. The first layer 200 and the second layer 202 thus ride or sit atop a conventional public blockchain 178 (again, such as BITCOIN®, ETHEREUM®, or RIPPLE®) and provide additional public and/or private cryptographic proofs 170.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Figure 26:
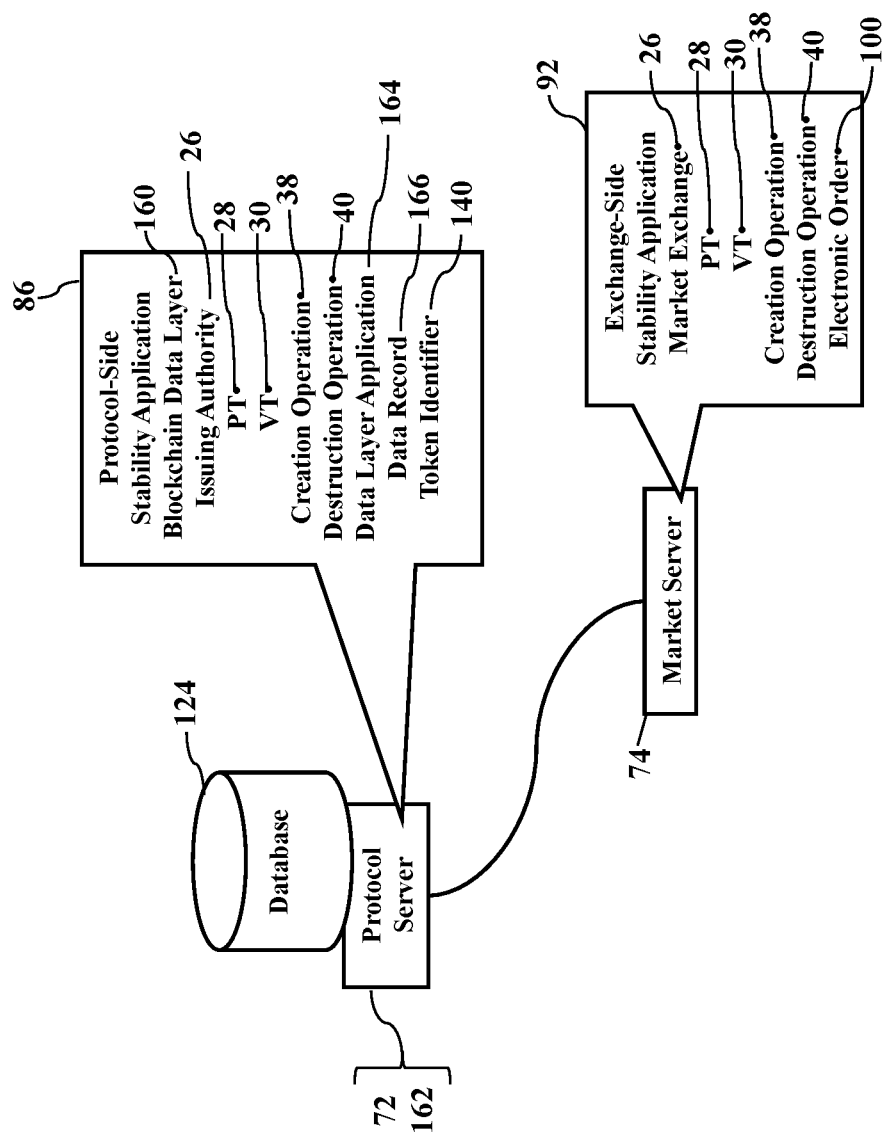
FIG. 26 illustrates fraud detection, according to exemplary embodiments.

FIG. 26 illustrates fraud detection, according to exemplary embodiments. Here destruction is confirmed to maintain the desired quantity or number of the pegged cryptographic tokens 28 and/or the variable-priced cryptographic tokens 30. For example, when the market server 74 receives the electronic order 100 (specifying the buy transaction 102 and/or the sell transaction 104, as illustrated with reference to FIG. 9) associated with any pegged cryptographic token 28, exemplary embodiments may first query the electronic database 124 for the corresponding token identifier 140. If an entry in the electronic database 124 associates the token identifier 140 to the destruction operation 40, then exemplary embodiments may escalate the electronic order 100 for a fraud review. In plain words, if the token identifier 140 is associated with a previous or historical destruction operation 40, then the corresponding pegged cryptographic token 28 may have already been destroyed in response to a previous or historical buy/sell order. The pegged cryptographic token 28 may have already been tagged or processed for deletion or removal from the market exchange 32, so its market presence may indicate a potential fraudulent order. Regardless, if fraud is suspected or inferred, exemplary embodiments may delay or even halt processing of the electronic order 100 for additional scrutiny.

The blockchain data layer 160 may also reveal fraudulent efforts. Again, when any electronic order 100 specifies any transaction involving any cryptographic token 28 or 30, exemplary embodiments may additionally or alternatively query the data records 166 in the blockchain data layer 160 for the corresponding token identifier 140. If any data record 166 contains a matching token identifier 140, the data record 166 may be retrieved and read/inspected for the destruction operation 40. If the data record 166 logs the destruction operation 40, then exemplary embodiments may infer that some party or market participant is attempting to buy/sell/convert a dead, destroyed, or uncirculated token 28 or 30.

Fraud detection may also apply to the variable-priced cryptographic tokens 30. When the electronic order 100 specifies a buy/sell of any variable-priced cryptographic token 30, exemplary embodiments may similarly query for its corresponding token identifier 140 to identify any past or historical destruction operation 40. Again, if the variable-priced cryptographic token 30 was previously slated for deletion or removal from the market exchange 32, its continued market presence may indicate a potential fraudulent order.

Exemplary embodiments may thus track circulation of the tokens 28 and 30 within the market exchange 32. Any token identifier 140 (or its hash value) may be compared to the entries in the electronic database 124 and/or to the blockchain data layer 160. Suppose, for example, the electronic database 124 only contains entries for active tokens 28 and 30. That is, the electronic database 124 may only have entries for the pegged cryptographic tokens 28 and/or the variable-priced cryptographic tokens 30 that are approved for trading in the market exchange 32. The token identifiers 140 of inactive or destroyed tokens 28 and 30, in other words, may not be logged in the electronic database 124. If the token identifier 140 fails to match an entry in the electronic database 124, then exemplary embodiments may infer that the corresponding token 28 or 30 is not authorize for trades and/or was previously destroyed.

Figure 27:
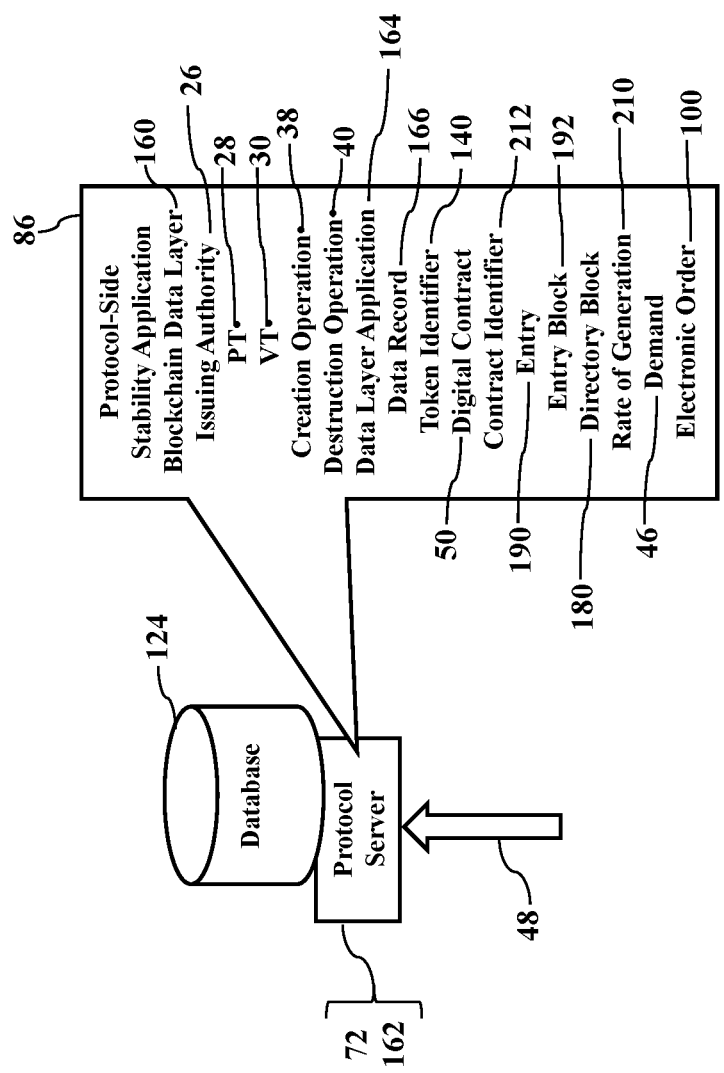
FIG. 27 illustrates monetary policy based on the blockchain data layer, according to exemplary embodiments.

FIG. 27 illustrates monetary policy based on the blockchain data layer 160, according to exemplary embodiments. As this disclosure previously explained, exemplary embodiments may manage the quantities of the pegged cryptographic tokens 28 and/or the variable-priced cryptographic tokens 30 within the market exchange 32 to stabilize their respective market pricing. Moreover, as the pegged cryptographic tokens 28 and/or the variable-priced cryptographic tokens 30 are bought, sold, created, and destroyed, exemplary embodiments may also generate the data records 166 representing the blockchain data layer 160 (such as the entries 190, the entry blocks 192, and/or the directory blocks 180 explained with reference to FIGS. 21-23). Exemplary embodiments may thus deposit and/or withdraw the tokens 28 and 30 based on the number of the entries 190, the entry blocks 192, and/or the directory blocks 180 generated within the blockchain data layer 160. For example, as the data records 166 are generated, the protocol server 72 may determine a rate 210 of generation. That is, as the data records 166 are generated when or while executing the digital contract 50, exemplary embodiments may sum or count the entries 190, the entry blocks 192, and/or the directory blocks 180 that are generated over time (such as per second, per minute, or other interval). Exemplary embodiments, for example, may call or initialize a counter having an initial value (such as zero). At an initial time (such as when the blockchain 48 is received or when a contract identifier 212 or token identifier 140 is determined), the counter commences or starts counting or summing the number of the entries 190, the entry blocks 192, and/or the directory blocks 180 (generated within the blockchain data layer 160) that are commonly associated with or reference the blockchain 48, the token identifier 140 (perhaps according to the chain ID 174) and/or the contract identifier 212. The counter stops counting or incrementing at a final time and exemplary embodiments determine or read the final value or count. Exemplary embodiments may then calculate the rate 210 of generation as the sum or count over time.

The rate 210 of generation may thus reflect the demand 46. As the demand 46 in the market exchange 32 increases, increasing numbers of the electronic orders 100 are being processed (regardless of the pegged cryptographic tokens 28 and/or the variable-priced cryptographic tokens 30) and increasing numbers of the data records 166 are being generated in the blockchain data layer 160. As the rate 210 of generation increases, the protocol-side stability application 86 may infer that the demand 46 is also increasing. The protocol-side stability application 86 may thus cause the protocol server 72 to inspect the data records 166 to determine whether the demand 46 reflects the pegged cryptographic tokens 28 and/or the variable-priced cryptographic tokens 30. Once the demand 46 is clarified, the protocol-side stability application 86 may then instruct the protocol server 72 to deposit, or to withdraw, a desired amount of the pegged cryptographic tokens 28 and/or the variable-priced cryptographic tokens 30 to achieve pricing stability.

The rate 210 of generation may thus be a feedback mechanism. As the data records 166 are generated, the rate 210 of generation of the data records 166 provides advance notice of the demand 46. That is, the data records 166 may be generated quicker, or ahead in time, when compared to processing of the electronic order 100, especially if recordation to the blockchain 48 is delayed due to miner consensus. The rate 210 of generation may thus be a precursor or indicator for the algorithmic monetary policy performed by the protocol server 72.

Compensation may be due. As the protocol server 72 deposits and/or destroys the tokens 28 and 30 in the market exchange 32, a cryptographic fee may be charged, assessed, or debited. More cryptographic fees may be assed for generating the data records 166 in the blockchain data layer 160. The cryptographic fee may be paid or charged in the pegged cryptographic tokens 28, the variable-priced cryptographic tokens 30, and/or still another cryptographic coinage.

Entry credits may be required. Exemplary embodiments may impose or require one or more of the entry credits for depositing, or for withdrawing, the pegged cryptographic token 28 and/or the variable-priced cryptographic token 30 to achieve pricing stability. The entry credits may be paid or redeemed for accessing the market server 74 and/or for using the protocol server 72. The entry credits (and any other cryptographic processing fees) thus protect the blockchain environment 22 from spam, numerous failed/fraudulent transactions, and other attacks.

Exemplary embodiments may include a cloud-based blockchain service provided by a cloud service provider. When the creation operation 38 or the destruction operation 40 is needed for stability, the protocol server 72 and/or the market server 74 may outsource or subcontract the creation operation 38 or the destruction operation 40 to the cloud service provider. The market server 74, for example, may generate and send a service request via the communications network 70 to the network address (such as an Internet protocol address) associated with the protocol server 72. The service request may include or specify any transactional details associated with the electronic order 100. The protocol server 72 acts on information in the service request, creates and/or destroys the tokens 28 and 30, generates the data records 166 in the blockchain data layer 160, and generates a service response. The service response may simply or comprehensively detail the creation operation 38 or the destruction operation 40. The protocol server 72 and the market server 74 may thus cooperate in a client/server fashion and cooperate to send, receive, and/or generate the service request, the service response, and/or the data records 166 in the blockchain data layer 160. A cryptographic fee may then be charged, assessed, or debited.

Figure 28:
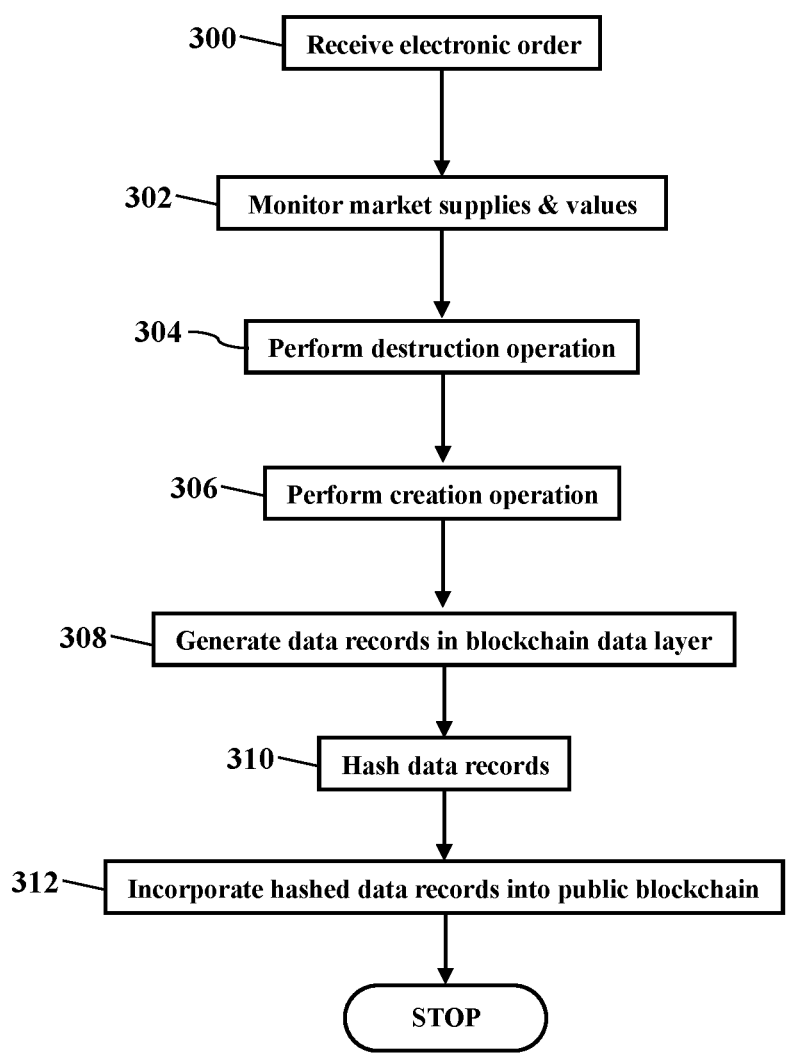
FIG. 28 is a flowchart illustrating a method or algorithm for stable pricing of cryptographic coinage, according to exemplary embodiments.

FIG. 28 is a flowchart illustrating a method or algorithm for stable pricing of cryptographic coinage, according to exemplary embodiments. The electronic order 100 is received (Block 300). As trades are processed, monitor market supplies and current market values 44 (Block 302). Perform destruction operation 40 to remove and destroy a quantity of the pegged cryptographic tokens 28 from the market exchange 32 to stabilize its current market value 44 to the target value 24 (Block 304). Perform creation operation 38 to create and deposit a quantity of the variable-priced cryptographic tokens 30 into the market exchange 32 (Block 306). The data records 166 in the blockchain data layer 160 are generated to document the destruction operation 40 and the creation operation 38 (Block 308). The data records 166 may be hashed (Block 310) and incorporated into the public blockchain (Block 312).

Figure 29:
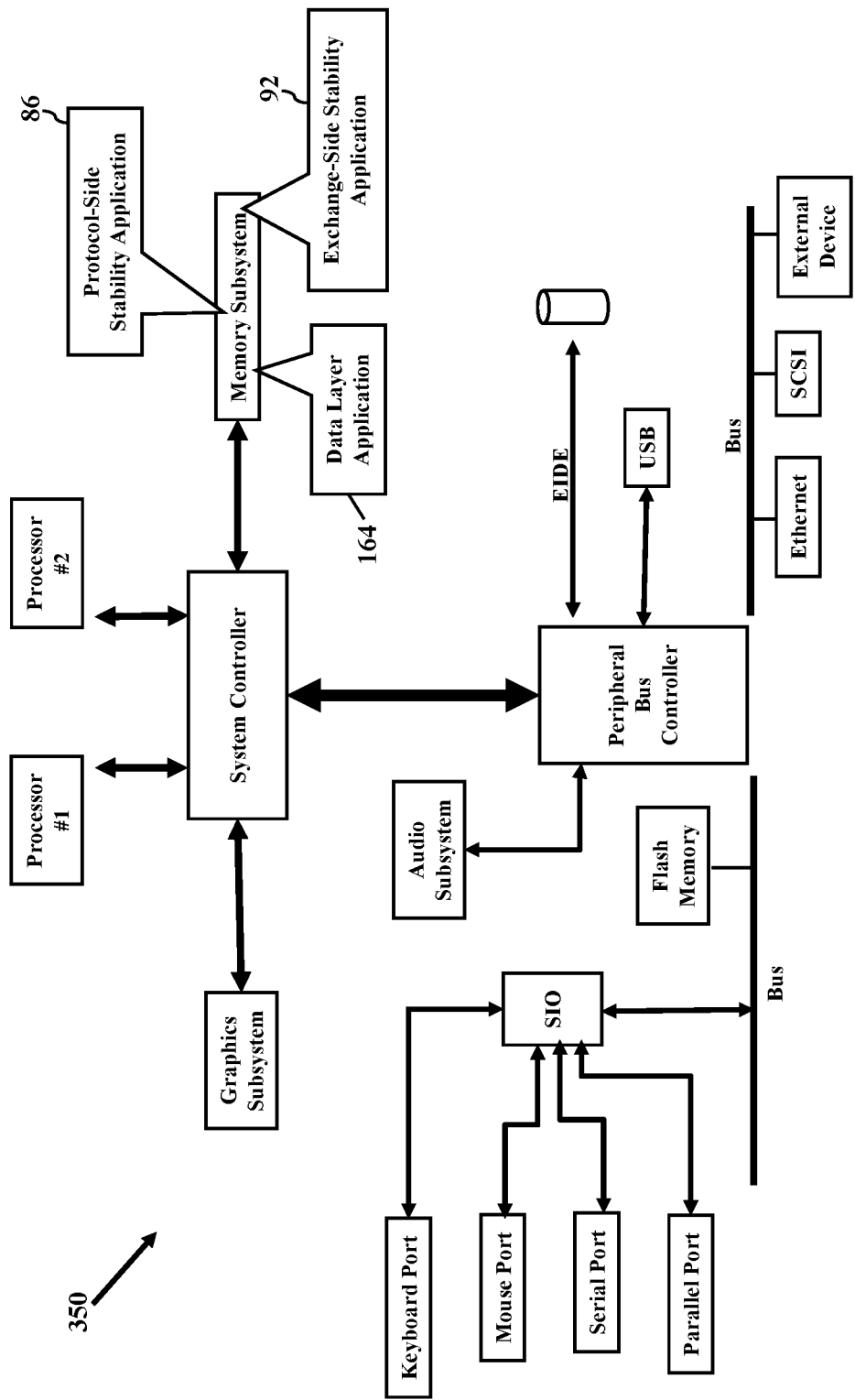
FIGS. 29-30 depict still more operating environments for additional aspects of the exemplary embodiments.

FIG. 29 is a schematic illustrating still more exemplary embodiments. FIG. 29 is a more detailed diagram illustrating a processor-controlled device 350. As earlier paragraphs explained, the protocol-side stability application 86, the exchange-side stability application 92, and/or the data layer application 164 may partially or entirely operate in any mobile or stationary processor-controlled device. FIG. 29, then, illustrates the protocol-side stability application 86, the exchange-side stability application 92, and/or the data layer application 164 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 30:
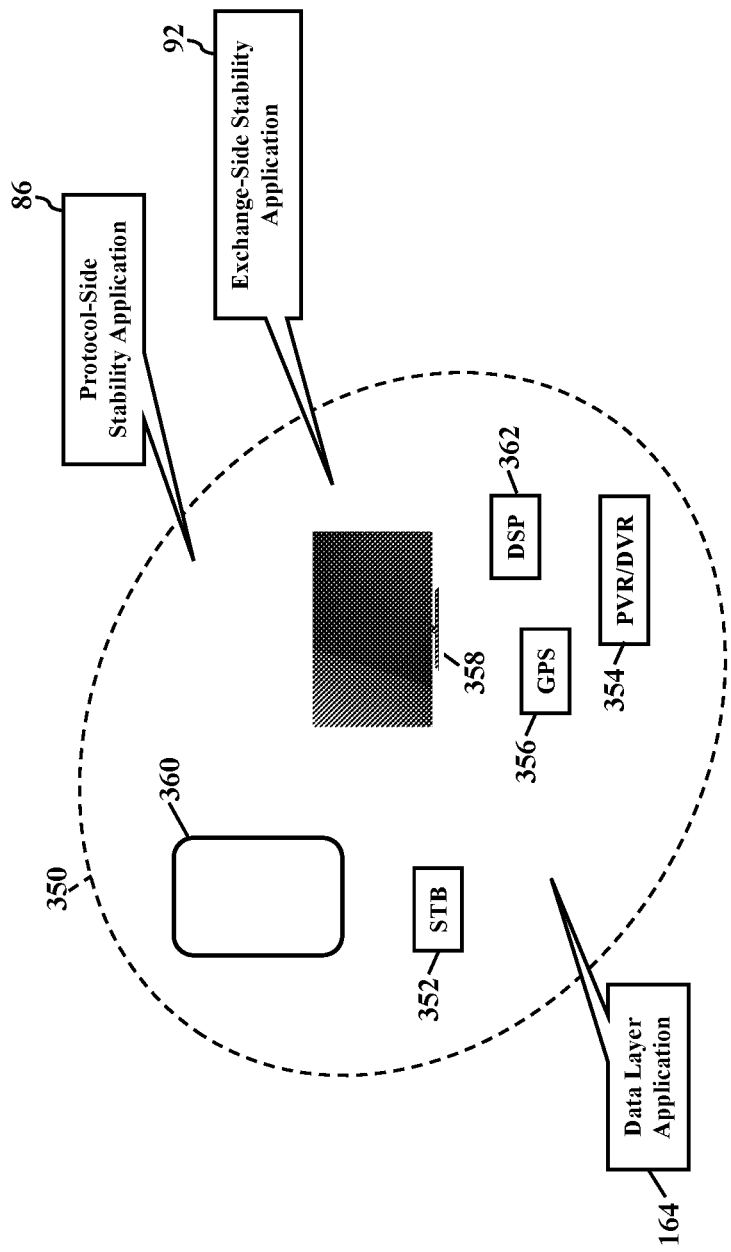

FIG. 30 depicts other possible operating environments for additional aspects of the exemplary embodiments. FIG. 30 illustrates the protocol-side stability application 86, the exchange-side stability application 92, and/or the data layer application 164 operating within various other processor-controlled devices 350. FIG. 30, for example, illustrates that the protocol-side stability application 86, the exchange-side stability application 92, and/or the data layer application 164 may entirely or partially operate within a set-top box ("STB") or other media player (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, cameras, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH, and any other.

Exemplary embodiments may be physically embodied on or in a computer-readable non-transitory storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for pricing stability of cryptographic coins, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method performed by a server monitoring cryptographic coinage transactions conducted between computers via a computer network, comprising:

receiving, by the server, a cryptographic coinage transaction of the cryptographic coinage transactions conducted between the computers via the computer network;

determining, by the server, a synthetic pair of cryptographic tokens specified by the cryptographic coinage transaction conducted between the computers via the computer network;

comparing, by the server, values of the synthetic pair of the cryptographic tokens traded between the computers in a decentralized market exchange conducted via the computer network to target values;

determining, by the server, a value difference between the values of the synthetic pair of the cryptographic tokens and the target values;

identifying, by the server, a destruction quantity by querying an electronic database for the value difference between the values of the synthetic pair of the cryptographic tokens and the target values, the electronic database having entries that associate value differences to destruction quantities including an entry of the entries that associates the destruction quantity to the value difference;

identifying, by the server, a creation quantity by querying the electronic database for the value difference between the values of the synthetic pair of the cryptographic tokens and the target values, the electronic database also having the entries that associate the value differences to creation quantities including another entry of the entries that associates the creation quantity to the value difference;

adjusting, by the server, the values of the synthetic pair of the cryptographic tokens by executing a destruction operation that destroys the destruction quantity of at least one of the synthetic pair of the cryptographic tokens from the decentralized market exchange conducted via the computer network; and adjusting, by the server, the values of the synthetic pair of the cryptographic tokens by executing a creation operation that deposits the creation quantity of at least one of the synthetic pair of the cryptographic tokens into the decentralized market exchange conducted via the computer network.

2. The method of claim 1, further comprising monitoring by the server a population supply of the synthetic pair of the cryptographic tokens traded between the computers in the decentralized market exchange conducted via the computer network.

3. The method of claim 1, further comprising logging by the server the destruction operation.

4. The method of claim 1, further comprising logging by the server the creation operation.

5. The method of claim 1, further comprising storing by the server the cryptographic coinage transaction in electronic association with the destruction operation.

6. The method of claim 1, further comprising storing by the server the cryptographic coinage transaction in electronic association with the creation operation.

7. A system monitoring cryptographic coinage transactions conducted between computers via a computer network, comprising:

a hardware processor; and a memory device storing instructions that when executed by the hardware processor perform operations, the operations comprising:

receiving a cryptographic coinage transaction of the cryptographic coinage transactions conducted between the computers via the computer network;

determining a synthetic pair of cryptographic tokens specified by the cryptographic coinage transaction conducted between the computers via the computer network;

comparing values of the synthetic pair of the cryptographic tokens traded between the computers in a decentralized market exchange conducted via the computer network;

determining a value difference between the values of the synthetic pair of the cryptographic tokens and target values;

identifying a destruction quantity by querying an electronic database for the value difference between the values of the synthetic pair of the cryptographic tokens and the target values, the electronic database having entries that associate value differences to destruction quantities including an entry of the entries that associates the destruction quantity to the value difference;

identifying a creation quantity by querying the electronic database for the value difference between the values of the synthetic pair of the cryptographic tokens and the target values, the electronic database also having the entries that associate the value differences to creation quantities including another entry of the entries that associates the creation quantity to the value difference;

adjusting the values of the synthetic pair of the cryptographic tokens by executing a destruction operation that destroys the destruction quantity of at least one of the synthetic pair of the cryptographic tokens from the decentralized market exchange conducted via the computer network; and adjusting the values of the synthetic pair of the cryptographic tokens by executing a creation operation that deposits the creation quantity of at least one of the synthetic pair of the cryptographic tokens into the decentralized market exchange conducted via the computer network.

8. The system of claim 7, wherein the operations further comprise logging the destruction operation.

9. The system of claim 7, wherein the operations further comprise logging the creation operation.

10. The system of claim 7, wherein the operations further comprise storing the cryptographic coinage transaction in electronic association with the destruction operation.

11. The system of claim 7, wherein the operations further comprise storing the cryptographic coinage transaction in electronic association with the creation operation.

* * * * *